(12) United States Patent
Azari et al.

(10) Patent No.: US 11,599,779 B2
(45) Date of Patent: Mar. 7, 2023

(54) NEURAL NETWORK CIRCUITRY HAVING APPROXIMATE MULTIPLIER UNITS

(71) Applicants: Elham Azari, Tempe, AZ (US); Sarma Vrudhula, Chandler, AZ (US)

(72) Inventors: Elham Azari, Tempe, AZ (US); Sarma Vrudhula, Chandler, AZ (US)

(73) Assignee: Arizona Board of Regents on Behalf of Arizona State University, Scottsdale, AZ (US)

(*) Notice: Subject to any disclaimer, the term of this patent is extended or adjusted under 35 U.S.C. 154(b) by 696 days.

(21) Appl. No.: 16/682,233

(22) Filed: Nov. 13, 2019

(65) Prior Publication Data
US 2020/0160159 A1      May 21, 2020

Related U.S. Application Data

(60) Provisional application No. 62/767,667, filed on Nov. 15, 2018.

(51) Int. Cl.
*G06N 3/04* (2006.01)
*G06N 3/063* (2006.01)
*G06F 13/40* (2006.01)

(52) U.S. Cl.
CPC ......... *G06N 3/063* (2013.01); *G06F 13/4027* (2013.01); *G06N 3/0445* (2013.01)

(58) Field of Classification Search
CPC ......... G06F 13/4027; G06T 1/20; G06T 1/60; G06N 3/0445; G06N 3/063
USPC .......................................................... 706/15
See application file for complete search history.

(56) References Cited

U.S. PATENT DOCUMENTS

| | | |
|---|---|---|
| 7,630,852 B1 | 12/2009 | Ghanta et al. |
| 8,164,359 B2 | 4/2012 | Leshner et al. |
| 8,181,133 B2 | 5/2012 | Gowda et al. |
| 8,601,417 B2 | 12/2013 | Gowda et al. |
| 8,832,614 B2 | 9/2014 | Vrudhula et al. |
| 9,306,151 B2 | 4/2016 | Vrudhula et al. |

(Continued)

FOREIGN PATENT DOCUMENTS

| | | |
|---|---|---|
| WO | 2009102948 A2 | 8/2009 |
| WO | 2010048206 A1 | 4/2010 |

(Continued)

OTHER PUBLICATIONS

U.S. Appl. No. 16/926,718, filed Jul. 12, 2020, Vrudhula et al.

*Primary Examiner* — Jacinta M Crawford
(74) *Attorney, Agent, or Firm* — Withrow & Terranova, P.L.L.C.

(57) ABSTRACT

Disclosed is neural network circuitry having a first plurality of logic cells that is interconnected to form neural network computation units that are configured to perform approximate computations. The neural network circuitry further includes a second plurality of logic cells that is interconnected to form a controller hierarchy that is interfaced with the neural network computation units to control pipelining of the approximate computations performed by the neural network computational units. In some embodiments the neural network computation units include approximate multipliers that are configured to perform approximate multiplications that comprise the approximate computations. The approximate multipliers include preprocessing units that reduce latency while maintaining accuracy.

18 Claims, 19 Drawing Sheets

(56) References Cited

U.S. PATENT DOCUMENTS

| | | | |
|---|---|---|---|
| 9,356,598 | B2 | 5/2016 | Vrudhula et al. |
| 9,466,362 | B2 | 10/2016 | Yu et al. |
| 9,473,139 | B2 | 10/2016 | Vrudhula et al. |
| 9,490,815 | B2 | 11/2016 | Vrudhula et al. |
| 9,876,503 | B2 | 1/2018 | Vrudhula et al. |
| 9,933,825 | B2 | 4/2018 | Hanumaiah et al. |
| 9,934,463 | B2 | 4/2018 | Seo et al. |
| 10,133,323 | B2 | 11/2018 | Hanumaiah et al. |
| 10,250,236 | B2 | 4/2019 | Vrudhula et al. |
| 10,447,249 | B2 | 10/2019 | Vrudhula et al. |
| 10,551,869 | B2 | 2/2020 | Vrudhula et al. |
| 10,795,809 | B2 | 10/2020 | Yang et al. |
| 2017/0169326 | A1* | 6/2017 | Diamos .................. G06N 3/088 |
| 2018/0174036 | A1 | 7/2018 | Han et al. |
| 2019/0122101 | A1* | 4/2019 | Lei ......................... G06F 17/16 |
| 2019/0228285 | A1* | 7/2019 | Zhang ................. G06N 3/0454 |

FOREIGN PATENT DOCUMENTS

| | | |
|---|---|---|
| WO | 2014151323 A1 | 9/2014 |
| WO | 2015006342 A1 | 1/2015 |
| WO | 2016191383 A1 | 12/2016 |
| WO | 2016191385 A1 | 12/2016 |
| WO | 2017190089 A1 | 11/2017 |

\* cited by examiner

NEURAL NETWORK CIRCUITRY HAVING APPROXIMATE MULTIPLIER UNITS

RELATED APPLICATIONS

This application claims the benefit of provisional patent application Ser. No. 62/767,667, filed Nov. 15, 2018, the disclosure of which is hereby incorporated herein by reference in its entirety.

FIELD OF THE DISCLOSURE

The present disclosure generally relates to artificial intelligence technology.

BACKGROUND

Among the numerous neural network (NN) models, recurrent neural networks (RNN), which are distinguished by the presence of feedback connections, have been shown to be much better suited than feed-forward NNs, such as convolutional neural networks (CNNs), for many sequence labeling tasks in the field of machine learning. RNNs are designed to capture the temporal dependencies within data sequences and have been shown to learn the long-term trends and patterns inherent in sequences. To alleviate the vanishing gradient problem in standard RNNs and to be able to learn the patterns over a larger number of time steps, more advanced RNN models, such as gated recurrent units (GRUs) and long short-term memory (LSTM) have been developed. The LSTM model has been shown to be highly robust and accurate for many applications involving time series data, including natural language processing and video analysis. The LSTM model is now used in virtual assistant user interfaces such as Apple Siri, Amazon Alexa, and Google Assistant. Such applications are typically launched on mobile devices, but due to their compute-intensive nature, they are executed on cloud servers. With the emergence of the Internet of Things and the further proliferation of mobile devices, this approach is not scalable, and hence there is a need to move some or all of the NN computations to energy-constrained, performance-limited mobile devices. This poses difficult challenges associated with simultaneously achieving high energy efficiency and high throughput. These challenges are due to the recursive structure of the LSTM model and the compute-intensive operations on very large dimensional data as well as the high memory-bandwidth requirement for computing on a large number of parameters. The present disclosure relates to achievement of high energy efficiency by employing low power and compact computation units and aggressively maximizing the overall throughput.

SUMMARY

Disclosed is neural network circuitry having a first plurality of logic cells in which the logic cells are interconnected to form neural network computation units that are configured to perform approximate computations. The neural network circuitry further includes a second plurality of logic cells in which the logic cells are interconnected to form a controller hierarchy that is interfaced with the neural network computation units to control pipelining of the approximate computations with all other computations, all performed by the neural network computational units. In some embodiments the neural network computation units include approximate multipliers that are configured to perform approximate multiplications that comprise the approximate computations. The approximate multipliers include preprocessing units that reduce latency while maintaining accuracy. In some exemplary embodiments, the neural network circuitry is long short-term memory circuitry.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

Figure 9:
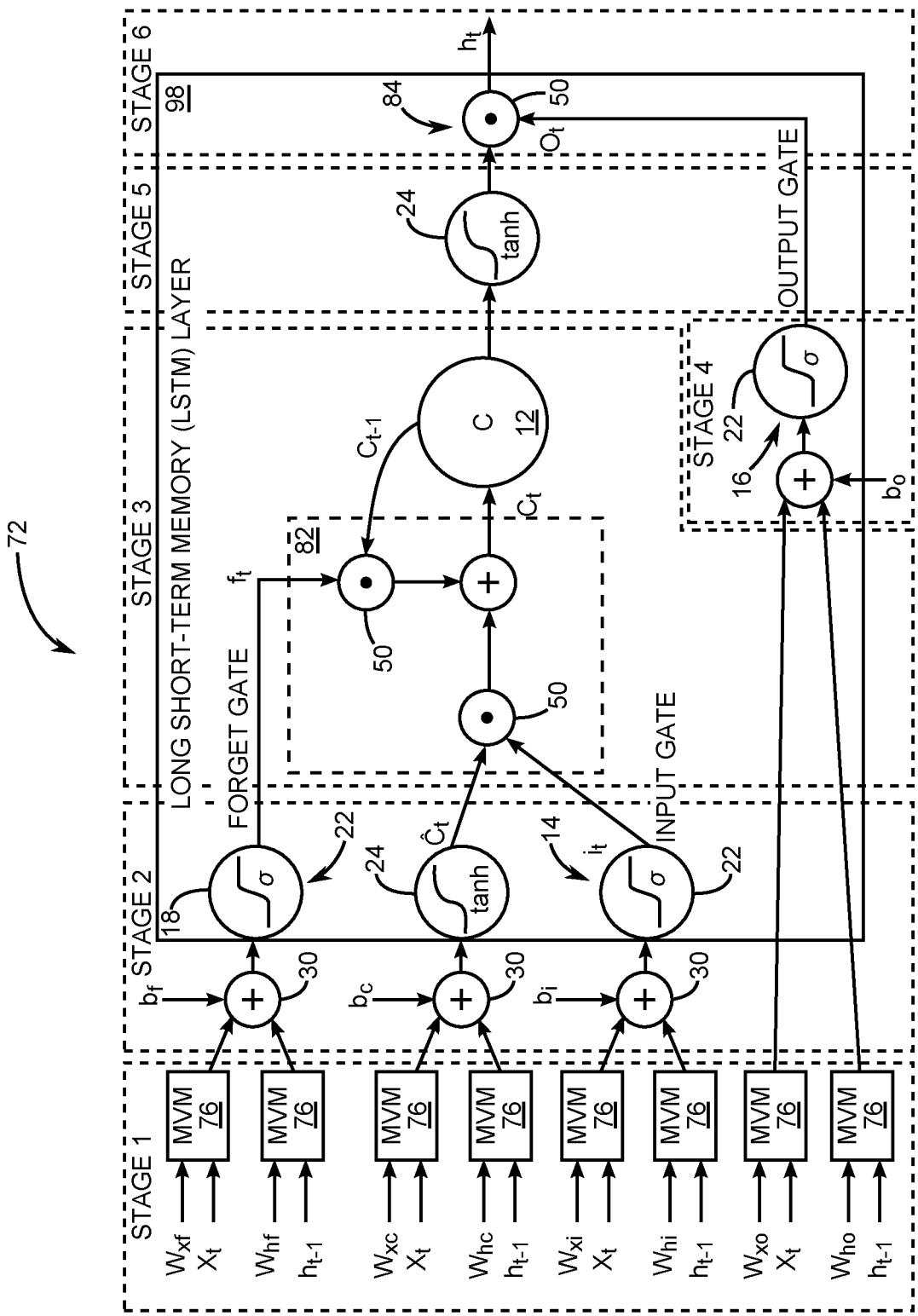

FIG. 9 is a diagram showing the six pipeline stages in the LSTM layer: Stage 1—eight parallel MVMs; Stage 2—three activation functions and ternary adders; Stage 3—two consecutive multiplications and an adder; Stage 4—a sigmoid function and a ternary adder; Stage 5—one tan h function; and Stage 6—one element-wise multiplication.

Figure 10:
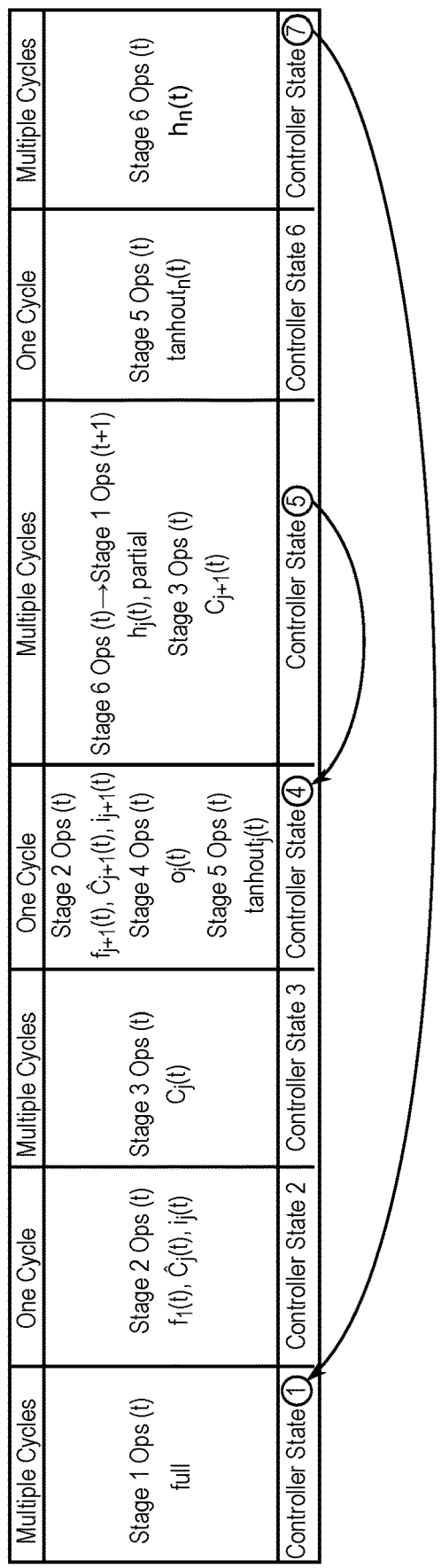

FIG. 10 is a diagram showing the control flow and the data computation in the pipelining method according to the present disclosure.

Figure 11:
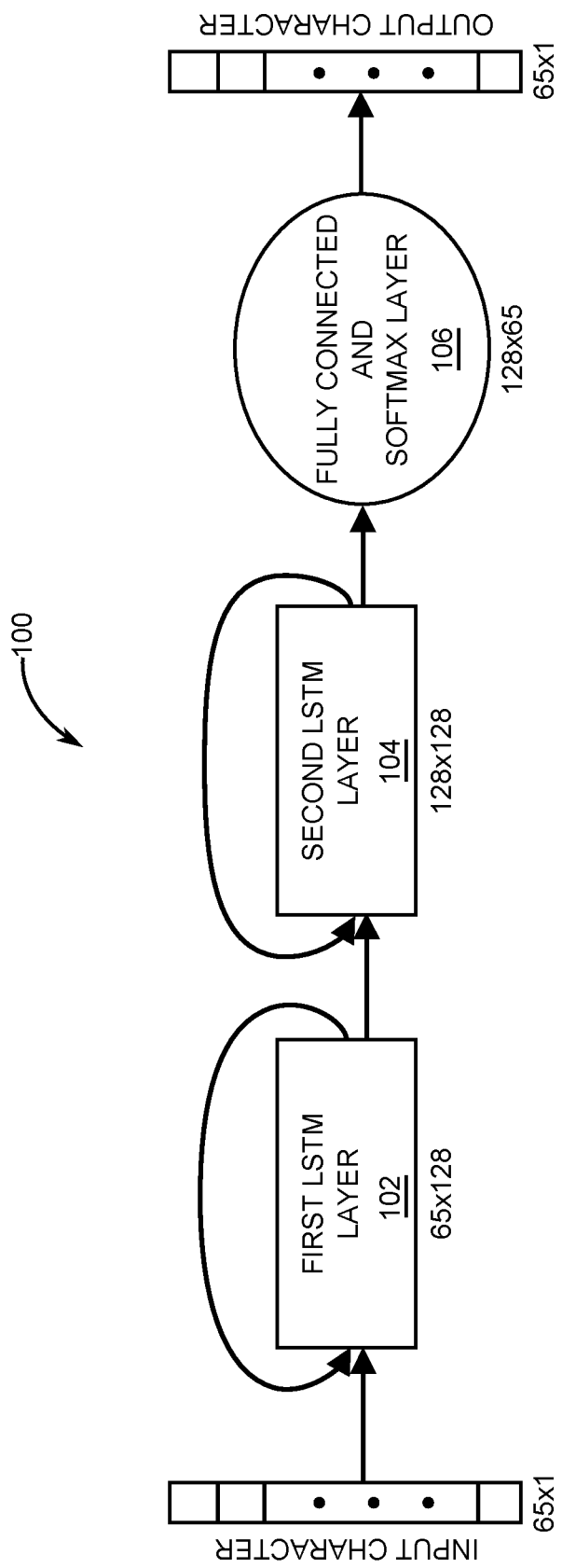

FIG. 11 is a diagram showing the network structure of language modeling that comprises two LSTM layers with 128 hidden nodes followed by the fully connected layer and softmax.

Figure 12:
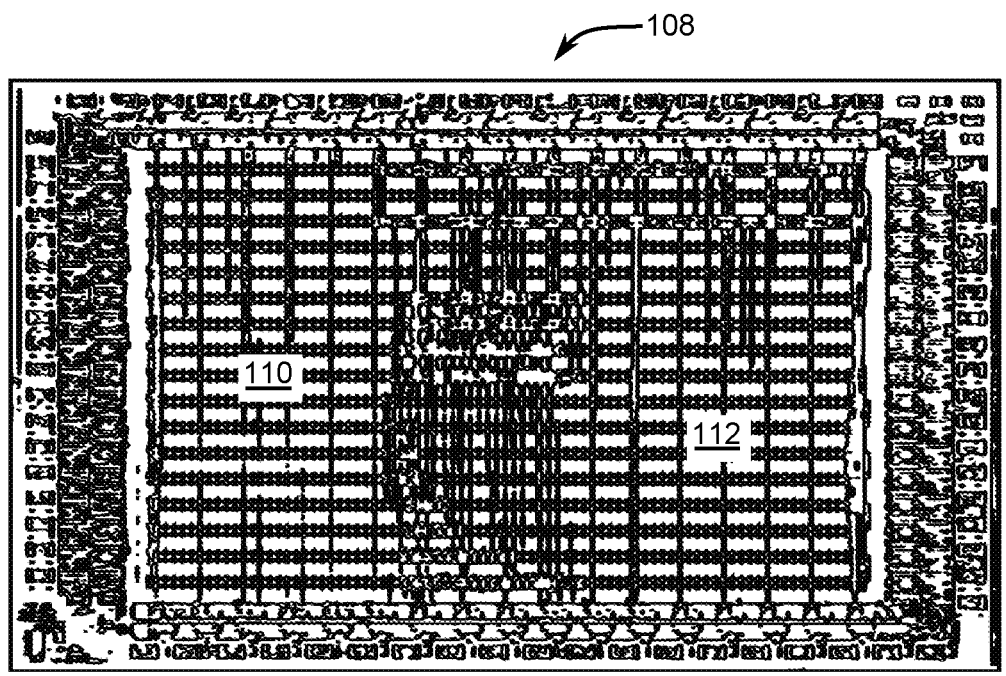

FIG. 12 is a line diagram of the physical layout of ELSA in an application-specific integrated circuit (ASIC) form realized in 65 nm complementary metal oxide semiconductor technology.

Figure 13:
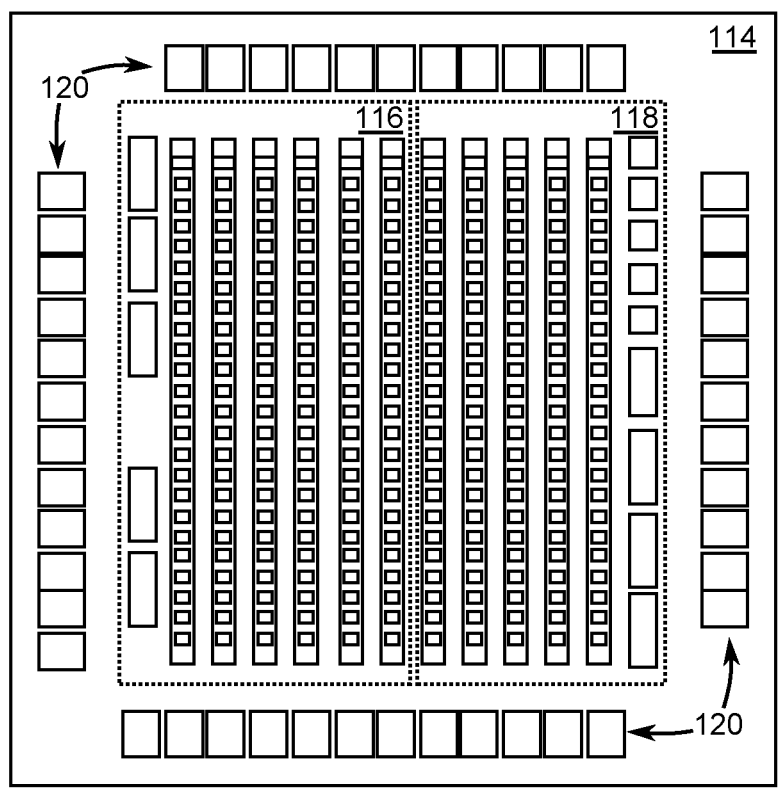

FIG. 13 is a line diagram of a field-programmable gate array (FPGA) in which ELSA is implemented.

Figure 14A:
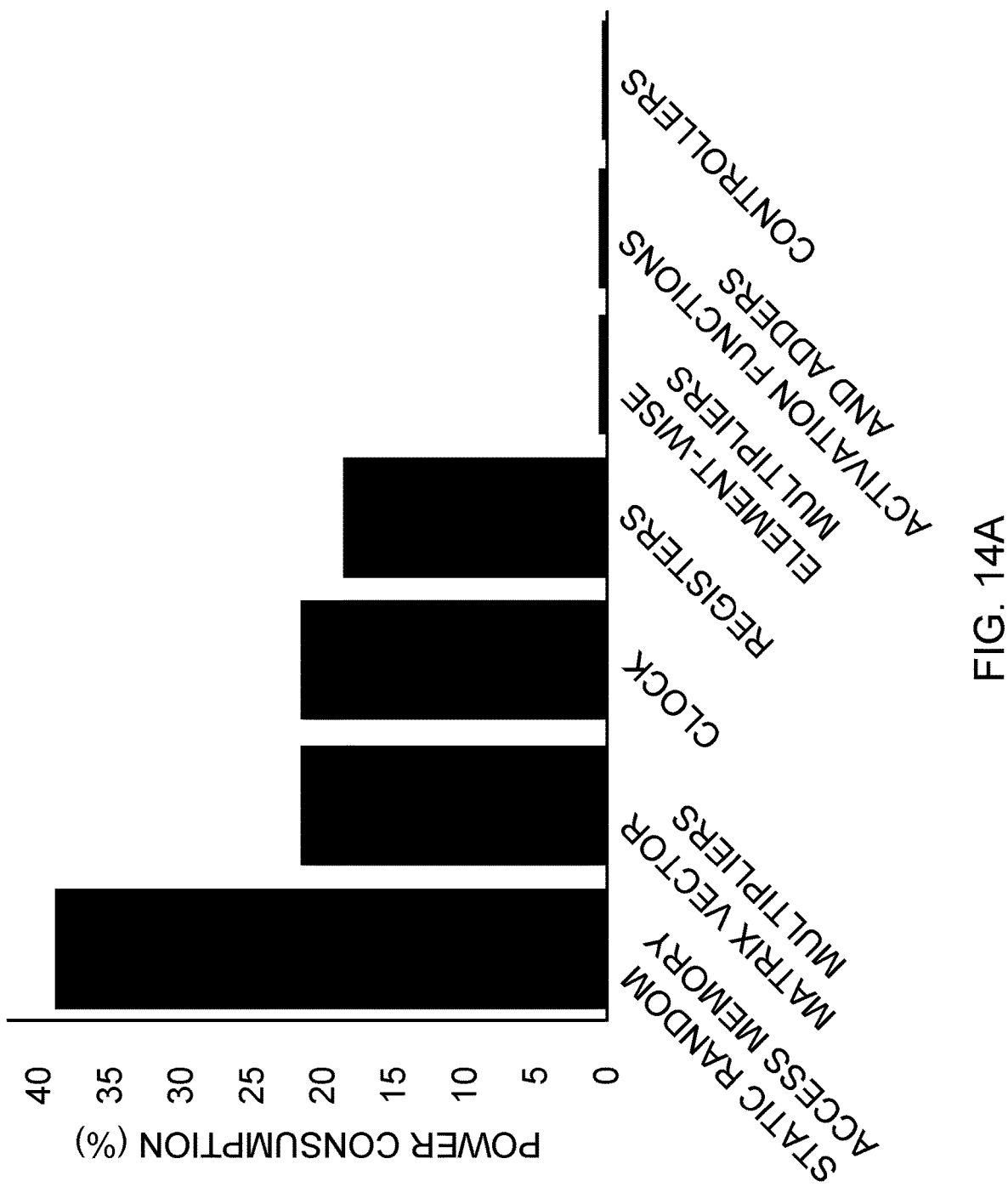
Figure 14B:
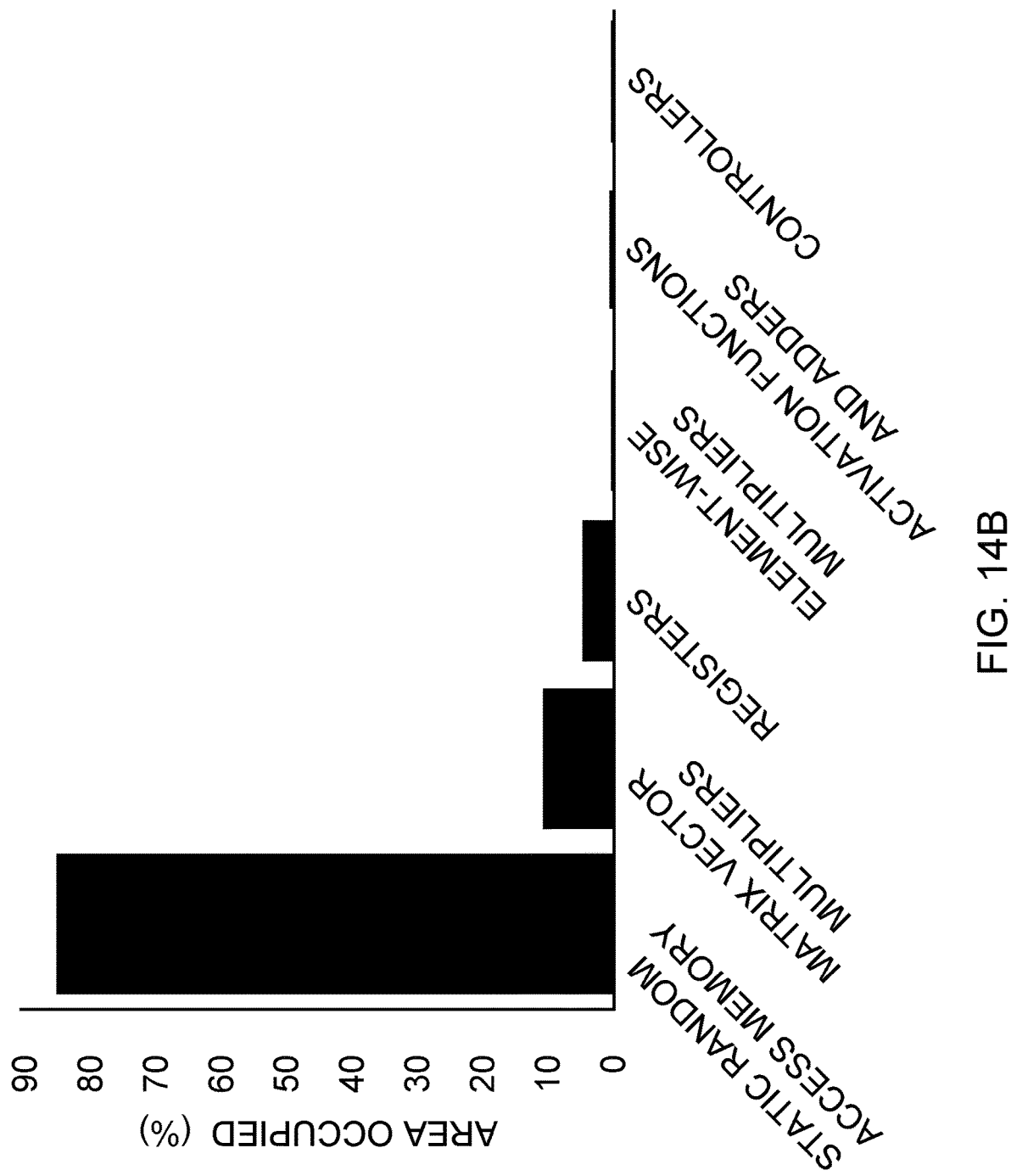

FIGS. 14A and 14B are bar graphs showing power and area breakdown, respectively, of the components of ELSA, including the SRAMs.

Figure 15:
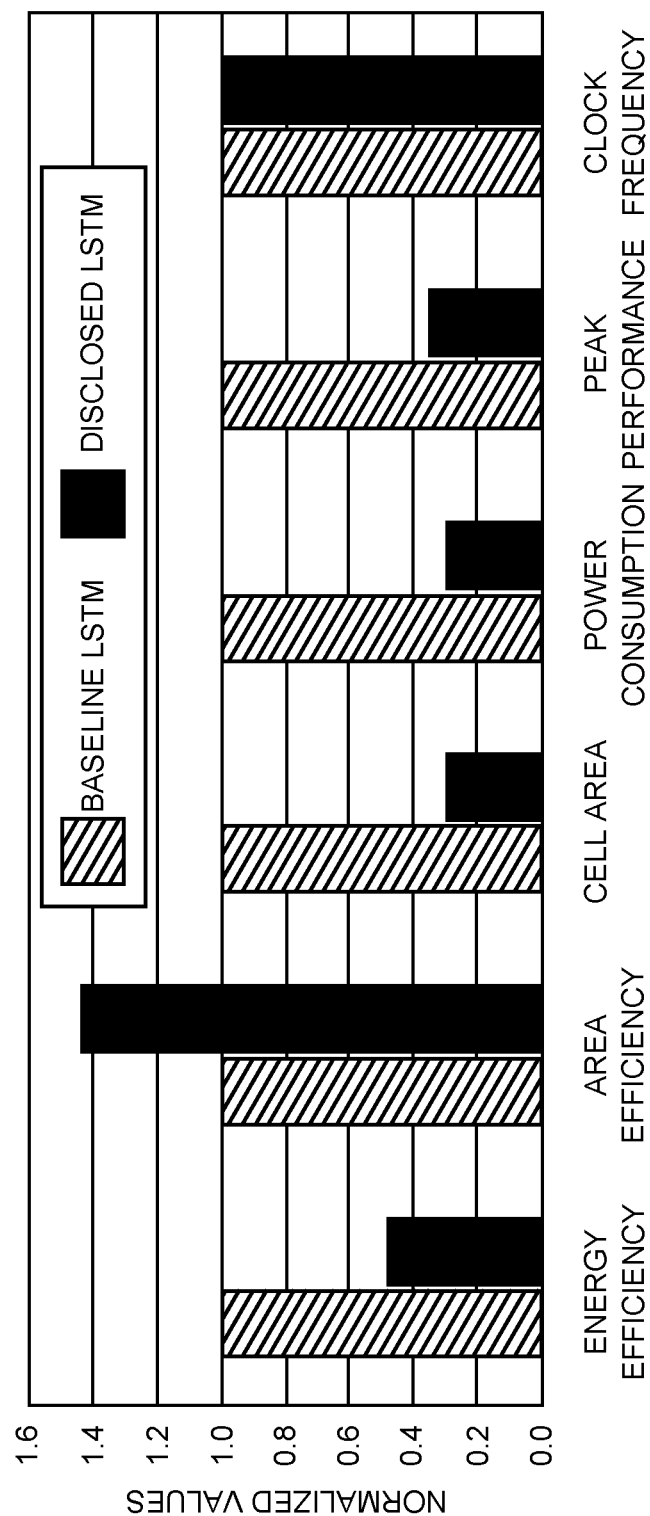

FIG. 15 is a bar graph showing the ASIC implementation results of ELSA compared with the Baseline-LSTM with both operated at the same frequency.

Figure 16:
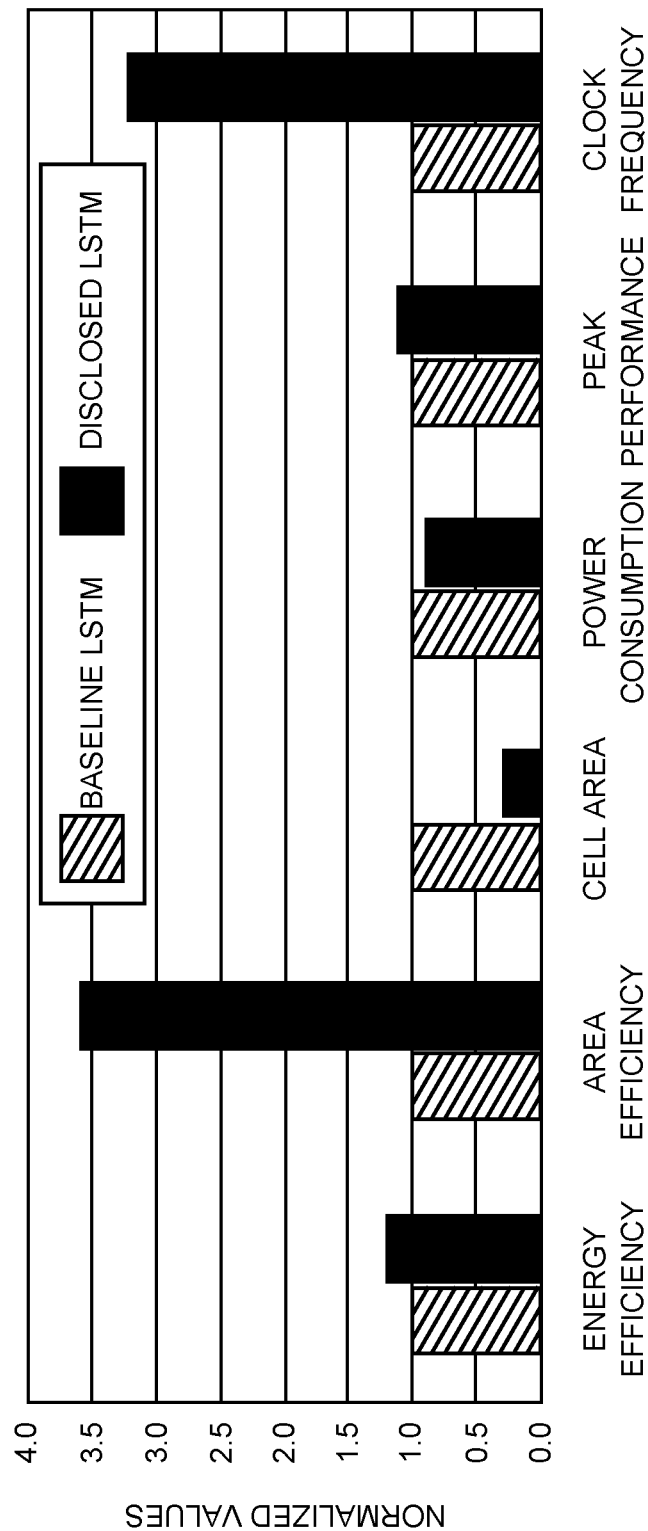

FIG. 16 is a bar graph showing the ASIC implementation results of ELSA compared with the Baseline-LSTM with both operated at their individual maximum achievable clock frequencies.

Figure 17A:
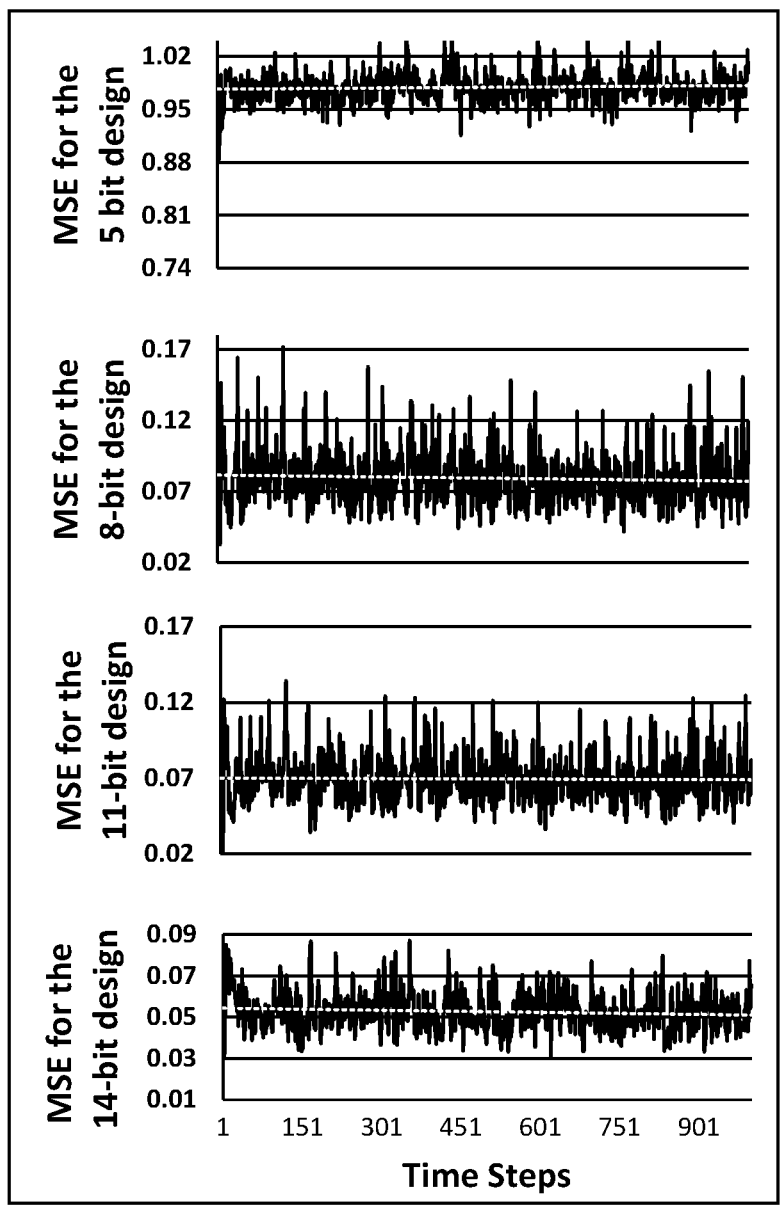
Figure 17B:
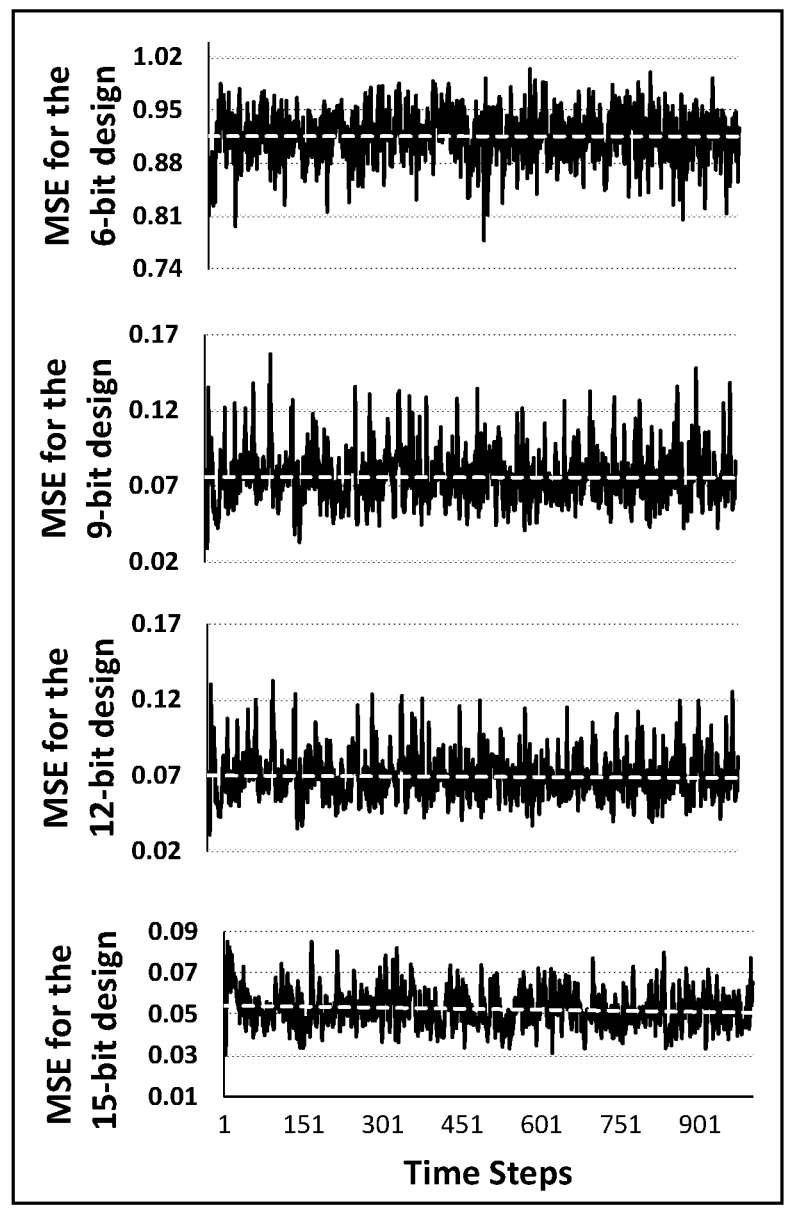
Figure 17C:
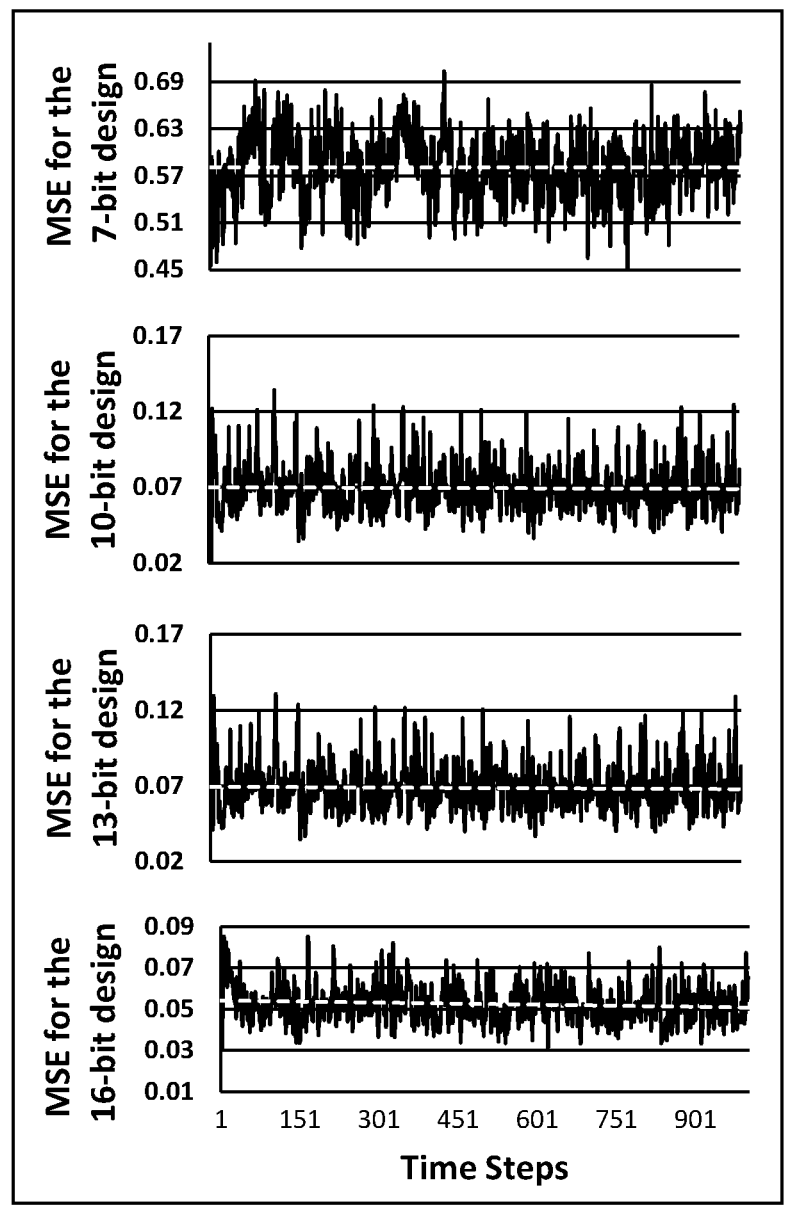

FIGS. 17A, 17B, and 17C are plots showing the mean squared error (MSE) of the hidden state of ELSA and the floating point for different bit precisions.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A next significant step in the evolution and proliferation of artificial intelligence technology is the integration of neural network (NN) models within embedded and mobile systems. Such integration calls for the design of compact, energy-efficient NN models in silicon. The present disclosure relates to a scalable application-specific integrated circuit (ASIC) design of a long short-term memory (LSTM) accelerator named ELSA (energy-efficient LSTM accelerator) that is suitable for energy-constrained devices. The design includes several architectural improvements to achieve small area and high energy efficiency. To reduce the area and power consumption of the overall design, the compute-intensive units of ELSA employ approximate multiplications and still achieve high performance and accuracy. The performance is further improved through efficient synchronization of the elastic pipeline stages to maximize the utilization. The present disclosure also includes a performance model of ELSA as a function of the hidden nodes and time steps, permitting its use for the evaluation of any LSTM application. ELSA was implemented in register transfer language and was synthesized and placed and routed in 65 nm technology. The functionality of ELSA is demonstrated for language modeling—a common application of LSTM. ELSA is compared with a baseline implementation of an LSTM accelerator with standard functional units and without any of the architectural improvements of ELSA. The present disclosure also demonstrates that ELSA can achieve significant improvements in power, area, and energy-efficiency compared with the baseline design and several ASIC implementations reported in the literature, making it suitable for use in embedded systems and real-time applications.

Existing ASIC implementations of the LSTM model are based on conventional architectures. The overarching goal of ELSA is to aggressively reduce the power consumption and area of the LSTM components and then to use architectural-level techniques to boost the performance. This is achieved by two main steps. First, low-power and compact computation units are designed and employed for the LSTM. Some of these units use approximate calculations, which require much lower power but incur a high execution time penalty, that is, it may take multiple clock cycles to finish one operation. Moreover, many of these units are on the critical path, which further degrades the performance. Second, to recover the throughput loss and achieve higher energy efficiency, efficient scheduling techniques have been developed that include overlapping of the computations at multiple levels—from the lowest level units up to the application. The main results of these improvements are summarized as follows:

1. The performance of a low-power approximate multiplier (AM) is significantly improved and incorporated in the compute-intensive units of ELSA. The execution time of the AM is data-dependent, and the number of clock cycles required to finish a single multiplication depends on the magnitude of the multiplicand. An intricate hierarchical control with four distinct, interacting controllers is designed to efficiently synchronize the single-cycle and variable-cycle operations in ELSA.

2. To maximize the throughput and compensate for the performance loss, elastic pipeline stages are incorporated at three levels. The first one is at the multiply and accumulate (MAC) level as these units are internally pipelined simultaneously. The second and third levels are at the LSTM layer (overlapping the operations at different time steps) and application, respectively.

3. A general performance model of ELSA as a function of hidden nodes and time steps is also presented to permit accurate evaluation of ELSA for any application that includes a network of LSTM layers, such as speech recognition and image captioning.

Section 2 describes the LSTM structure and its key computations. Section 3 describes a significantly improved version of an existing approximate multiplier, justifying the multiplier as described in the present disclosure and describing the design challenges it poses. Section 3 also explains the architecture of ELSA, including its controllers. Section 4 explains the multi-level elastic pipelining, and Section 5 includes the performance models for ELSA. Section 6 explains the application implemented for demonstrating the functionality of ELSA. The ASIC implementation results are compared with the baseline-LSTM and two existing implementations. Section 6 also demonstrates the accuracy of ELSA compared with floating-point and exact fixed-point designs. Section 7 offers a conclusion.

2 BACKGROUND: LONG SHORT-TERM MEMORY

Figure 1:
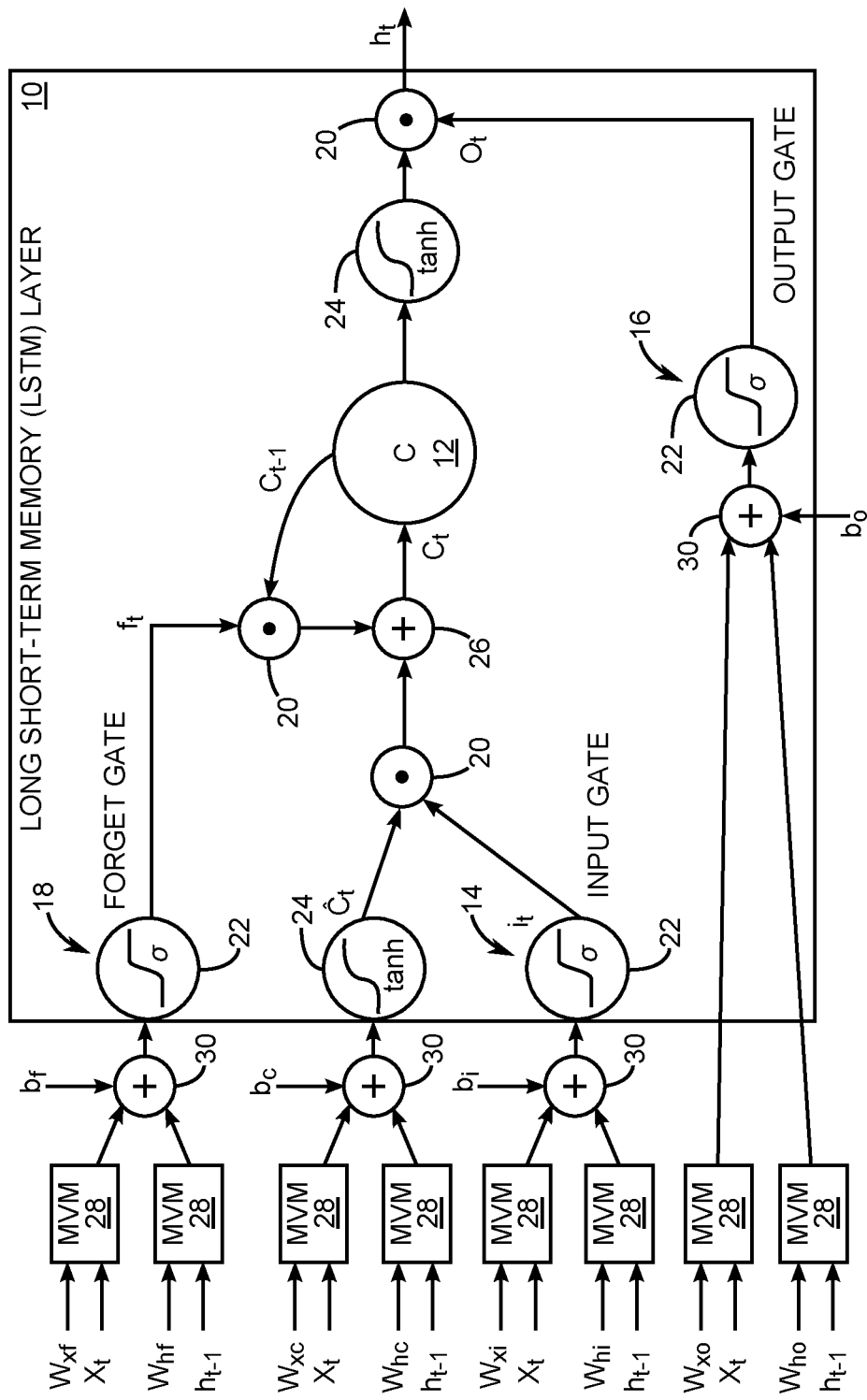
FIG. 1 is a diagram showing a structure of a related-art long short-term memory (LSTM) layer.

FIG. 1 is a diagram showing a structure of a related-art long short-term memory (LSTM) layer 10 that comprises a memory cell (C) 12, an input gate (i) 14, an output gate (o) 16, and a forget gate (f) 18. The related-art LSTM layer 10 further includes element-wise multipliers 20, sigmoid ($\sigma$) activation functions 22, hyperbolic tangent (tan h) activation functions 24, and an adder accumulator unit 26. A plurality of matrix-vector multiplier units 28 and a plurality of ternary vector adder units 30 provide input to the related-art LSTM layer 10.

The input is a temporal sequence $X=(x_1, x_2, \ldots, x_T)$ and the output is a sequence $h=(h_1, h_2, \ldots, h_T)$, referred to as the hidden state, that is generated iteratively over T time steps. The memory cell (C) 12 stores some part of the history over a specific period of time. At each iteration, the input gate 14 controls the fraction of the input data to be remembered and the forget gate 18 determines how much of the previous history needs to be deleted from the current memory state ($C_t$). The output gate 16 decides how much of the processed information needs to be generated as the output ($h_t$).

In a sequence learning task, let $X=(x_1, x_2, \ldots, x_T)$, where $x_t$ is the input to the related-art LSTM layer 10 at time step $t \in [1, 2, \ldots, T]$. The following equations show how the output sequence $h=(h_1, h_2, \ldots, h_T)$ of a layer is generated iteratively over T time steps:

$$i_t = \sigma(W_{xi}x_t + W_{hi}h_{t-1} + b_i), \quad (1)$$

$$o_t = \sigma(W_{xo}x_t + W_{ho}h_{t-1} + b_o), \quad (2)$$

$$f_t = \sigma(W_{xf}x_t + W_{hf}h_{t-1} + b_f), \quad (3)$$

$$\hat{C}_t = \tan h(W_{xc}x_t + W_{hc}h_{t-1} + b_c), \quad (4)$$

$$C_t = i_t \odot \hat{C}_t + f_t \odot C_{t-1}, \quad (5)$$

$$h_t = o_t \odot \tan h(C_t). \quad (6)$$

The element-wise multiplication is indicated by $\odot$. The parameters are the bias vectors (b's) and the weight matrices (W's), which are tuned during model training. $\hat{C}_t$ is the new candidate memory which contains the extracted information from the input. The non-linear activation functions, $\sigma \in (0, 1)$ and tan $h \in (-1, 1)$, are defined in Equations 7 and 8.

$$\sigma(x) = \frac{1}{1+e^{-x}} \quad (7)$$

$$\tanh(x) = \frac{e^x - e^{-x}}{e^x + e^{-x}} \quad (8)$$

The main challenge in the design of an LSTM architecture is the large number of matrix-vector multiplications (MVMs) involving large dimensional vectors, the element-wise multiplications (EMs), and the data movements from and to the memory.

3. ARCHITECTURE OF PRESENT EMBODIMENTS

3.1 Approximate Multiplier

Figure 2:
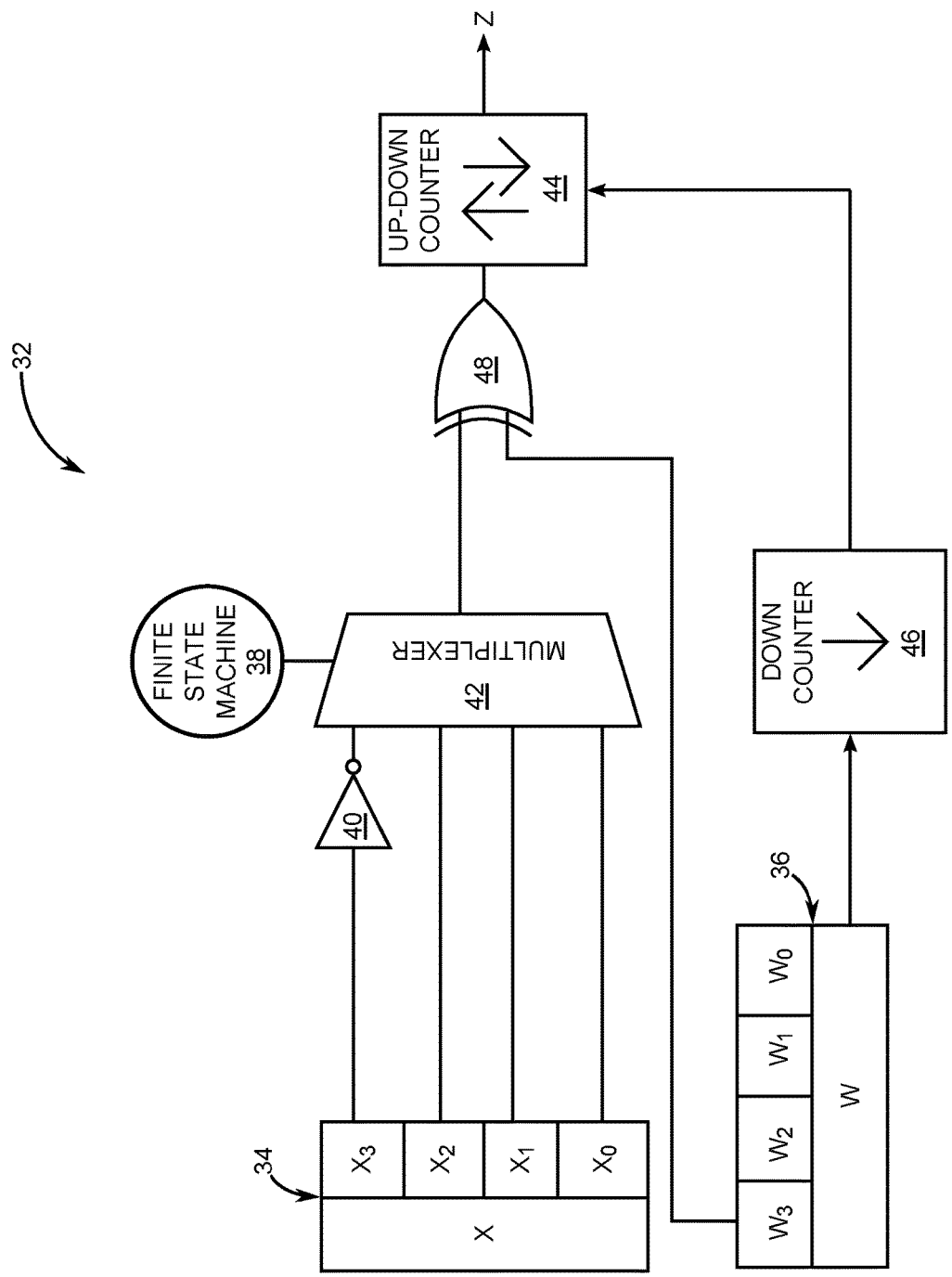
FIG. 2 is a diagram showing the structure of a related-art 4-bit signed approximate multiplier (AM).

FIG. 2 is a diagram of a related-art approximate multiplier (AM) 32. Advantages of the related-art AM 32 are its low logic complexity and reduced power consumption. The related-art AM 32 generates an approximate (but sufficiently accurate) product. Data X held in a first register 34 and weights W held in a second register 36 along with an output Z are represented as signed, fixed-point fractions, that is, in a binary fraction. For example, $X=x_{n-1} \cdot x_{n-2} x_{n-3} \ldots x_0$, the sign bit is $x_{n-1}$ and the fraction is $x_{n-2} x_{n-3} \ldots x_0$. Let $\mathcal{N}$ denote the numerator of a fraction. For example, in a 4-bit number X=1.010, $\mathcal{N}(X)=-6$ and its decimal value is −6/8. Let X and W be elements of [−1, 1] and be the inputs of the related-art AM 32 in an n bit multiplication. The exact product is XW. The related-art AM 32 produces an n-bit Z≈XW. The related-art AM 32 includes a finite-state machine (FSM) 38 (with $2^n$ states) that generates a specific bitstream {S}. The generation of this bitstream depends on the value of one of the operands, for example, X and its length is $|\mathcal{N}(W)|$. Specifically, in {S}, $X_{n-i}$ appears at cycle $2^{i-1}$, and then after every $2^i$ cycles, for i being an element of [1, n]. A main property of {S} is that the difference in the number of ones and zeros is an integer approximation to XW. The theoretical upper bound on the approximation error is $n/2^{n+1}$ but has been empirically shown to be far smaller, approaching the precision of floating point for n>8.

In this particular case, the related-art AM 32 has the structure of a 4-bit signed AM. Moreover, X and W are elements of [−1, 1], wherein X and W are the inputs, and Z is the output product. The sign bits are $x_3$ and $w_3$. The sign bit $x_3$ is inverted by an inverter 40. In this example, X=5/8, W=6/8, and n=4. The FSM 38 comprises $2^4$ states. A combined operation of the FSM 38 and a multiplexer (MUX) 42 generates the bitstream S={$\overline{x_3}$ $x_2$ $\overline{x_3}$ $x_1$ $\overline{x_3}$ $x_2$} at cycles {$c_1$ $c_2$ $c_3$ $c_4$ $c_5$ $c_6$}, respectively. An up-down counter 44 counts up as it receives one and counts down when it receives a zero and generates the product Z. A down counter 46 stops the up-down counter 44 after $|\mathcal{N}/(W)|$ cycles, which is 6 (i.e., $(6/8) \times 2^3$), in this example. An XOR gate 48 receives the bitstream {S} and the most significant bit (MSB) of W ($w_3$), and generates the input of the up-down counter 44 in sequence. Then, the output of the related-art AM 32 is produced by the up-down counter 44, which is 0.5. The exact result is 0.46, as shown in Table 1.

TABLE 1

| X | W | Input of the Up-Down Counter | Output of the AM | Exact Result |
|---|---|---|---|---|
| $x_3\ x_2\ x_1\ x_0$<br>0. 1 0 1 | $w_3\ w_2\ w_1\ w_0$<br>0. 1 1 0 | $c_6\ c_5\ c_4\ c_3\ c_2\ c_1$<br>1 1 0 1 1 1 | $\frac{4}{8} = 0.50$ | $\frac{30}{64} = 0.46$ |
| Initial Value of the Down Counter | | Initial Value of the Up-Down Counter | | |
| 6 | | 0 | | |

3.2 Extension to AM for a Faster Execution

Figure 3:
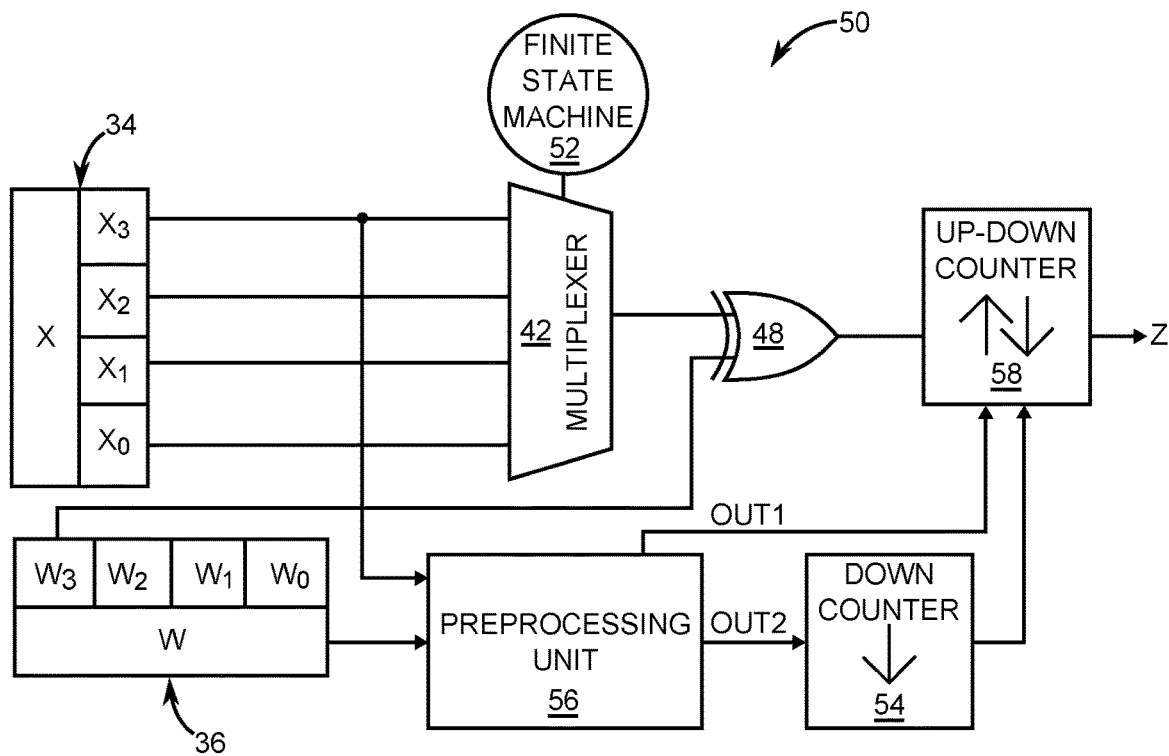
FIG. 3 is a diagram showing an improved version of an AM that is in accordance with the present disclosure.

FIG. 3 is a diagram showing an improved version of an AM 50 that is in accordance with the present disclosure. In this exemplary embodiment, the number of states in a finite state machine (FSM) 52 is reduced by half, and a down counter 54 is initialized to half of its value compared with the down counter 46 (FIG. 2). A preprocessing unit 56 sets the initial value of an up-down counter 58 to 3, that is, $\overline{X_3}$ is one and it appears three times in the bitstream depicted in FIG. 3. Hence, the initial value of the down counter 54 is set to 3, half of an original value used for the down counter 46 (FIG. 2). The AM 50 is a compact design with low power consumption; however, its execution time is high compared with a fixed-point exact multiplier. Hence, the structure of the related-art AM 32 (FIG. 2) has been modified to realize the AM 50 to improve execution time by 2× over the related-art AM 32 with negligible logic overhead (<0.03%), as shown in FIG. 3 and Table 2 below. This is achieved by adding the preprocessing unit 56 to extract the FSM patterns for the MSB of the first operand and initializing the up-down counter 58 by the computed value. Note that the FSM 38 (FIG. 2) selects the MSB every two cycles, whereas the modified structure of AM 50 leads to decreasing the latency of the related-art AM 32 by 50%.

Figure 4:
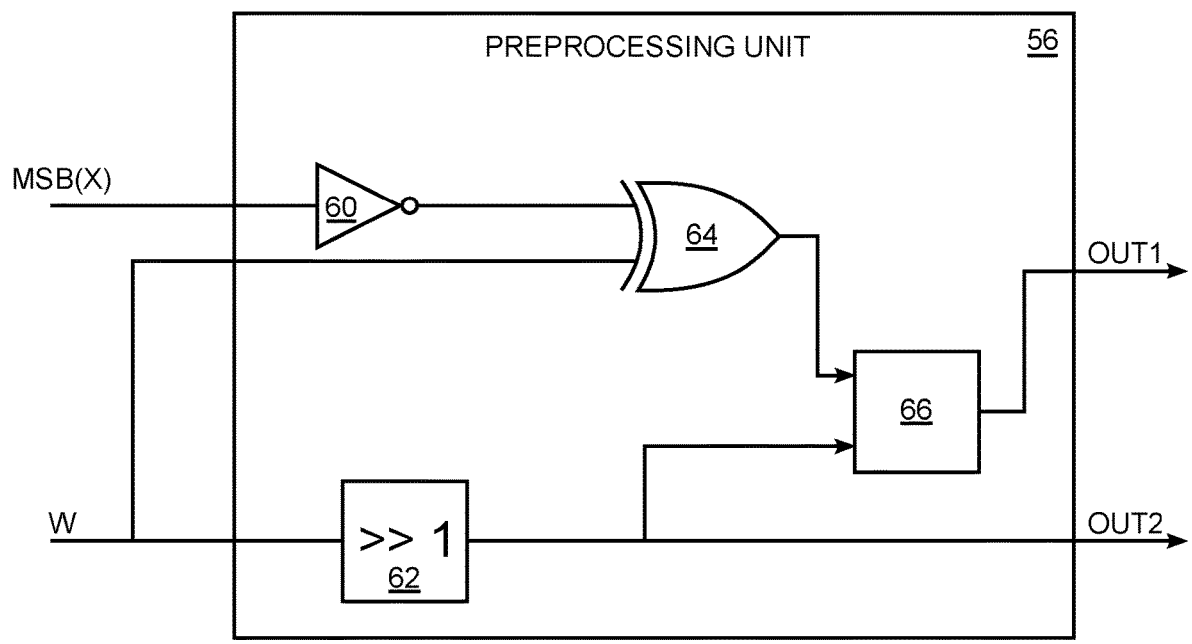
FIG. 4 is a diagram depicted an exemplary structure of a preprocessing unit that accelerates the AM depicted in FIG. 3.

As shown in FIG. 4, the preprocessing unit 56 comprises an inverter 60, a shifter 62, and an XOR gate 64. The preprocessing unit 56 receives the MSB of X (i.e., $\overline{X_3}$ in this example) and W as inputs and generates a first output OUT1 as an initial value of the up-down counter 58 and a second output OUT2 as an initial value of the down counter 54. The shifter 62 shifts the value of W to the right by one and sets the shifted value of W as the initial value of the down counter 54. The shift operation is also performed to set the initial value of the up-down counter 58, except that the sign of the computed value needs to be specified. The sign is determined by sign determining logic 66 based on the result of ( $\overline{X_3} \oplus W_3$), which is computed once in the preprocessing unit 56. If the result of the computation is a 1, the sign is positive; otherwise, the sign is negative. For the example shown in FIG. 3, a combined operation of the FSM 52 and the multiplexer 42 generates the bitstream S={$x_2\ x_1\ x_2$} at cycles {$c_1\ c_2\ c_3$}, respectively, which results in saving three (50%) cycles compared with the combined operation of the FSM 38 and the multiplexer 42 shown in FIG. 2. The present embodiments employ the accelerated AM 50 to achieve higher throughput, while maintaining low area and power consumption.

TABLE 2

| X | W | Input of the Up-Down Counter | Output of the AM | Exact Result |
|---|---|---|---|---|
| $x_3\ x_2\ x_1\ x_0$<br>0. 1 0 1 | $w_3\ w_2\ w_1\ w_0$<br>0. 1 1 0 | $c_3\ c_2\ c_1$<br>1 0 1 | $\frac{4}{8} = 0.50$ | $\frac{30}{64} = 0.46$ |
| Initial Value of the Down Counter | | Initial Value of the Up-Down Counter | | |
| 3 | | 3 | | |

3.3 Comparison with an Exact Multiplier

Figure 5A:
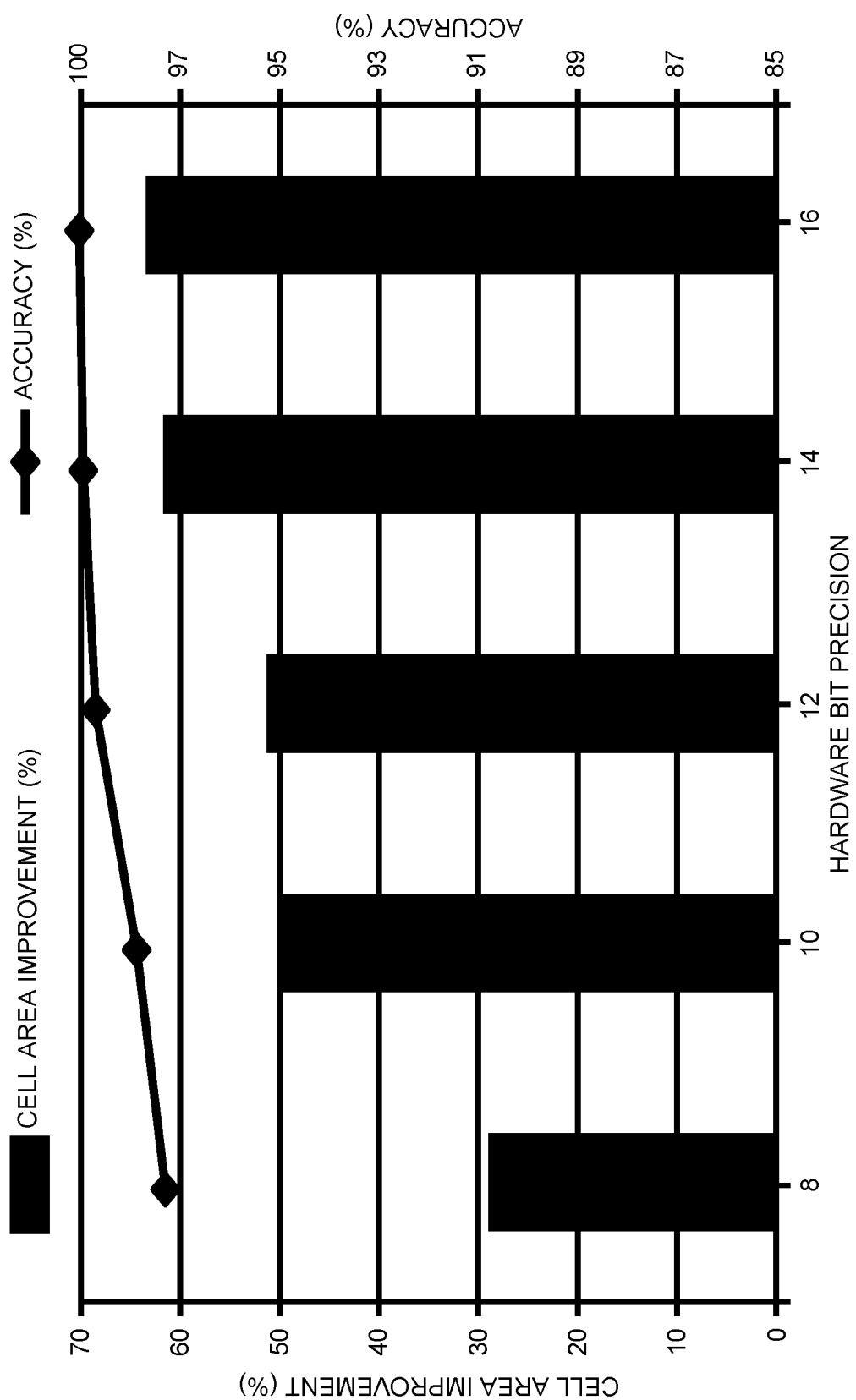
FIG. 5A is a bar graph showing the cell area improvement of an AM-MAC (multiply and accumulate) of the present disclosure compared with an Exact-MAC for different hardware bit precisions.
Figure 5B:
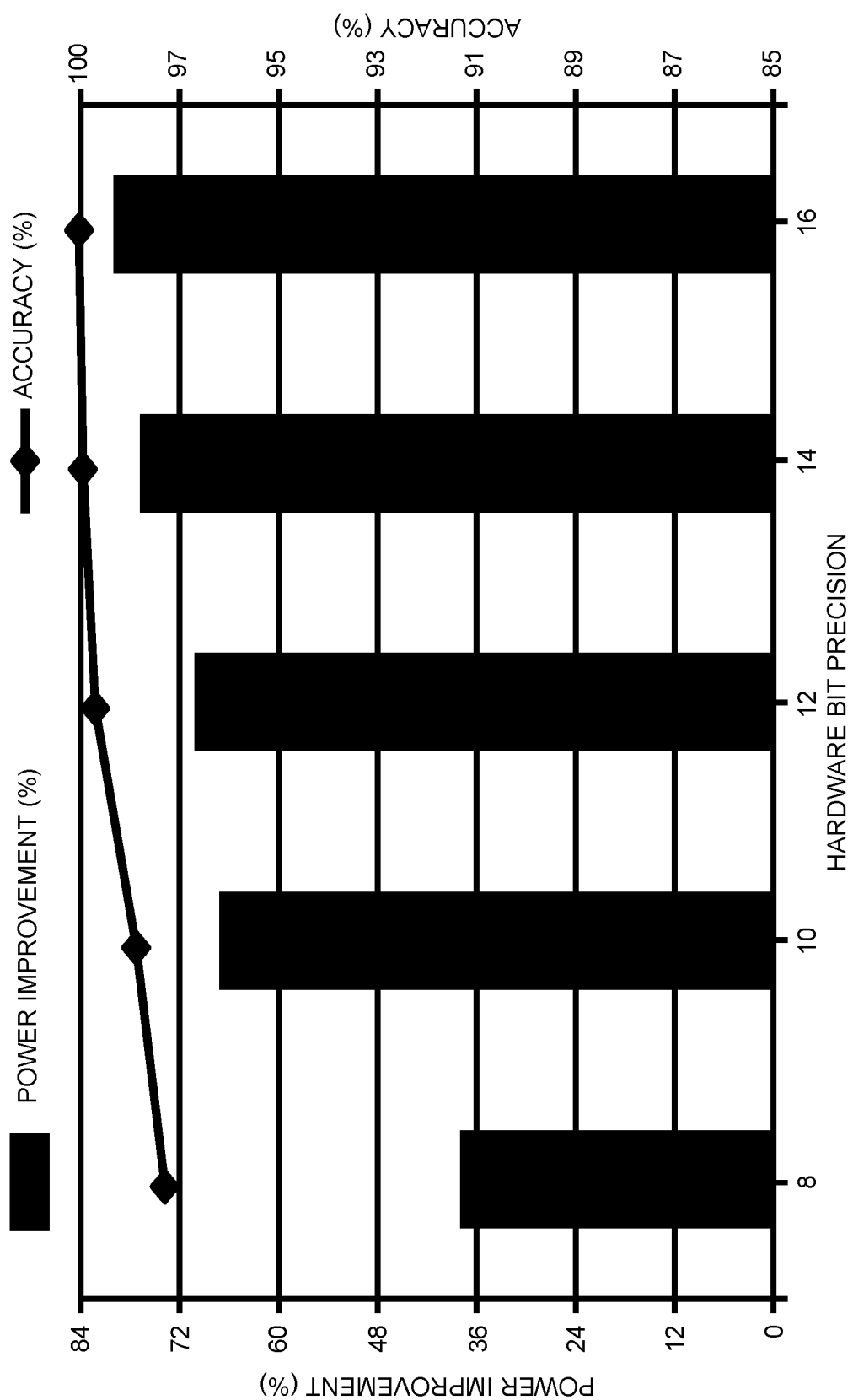
FIG. 5B is a bar graph showing the power improvement of the present AM-MAC compared with an Exact-MAC for different hardware bit precisions.

FIG. 5A is a bar graph showing the cell area improvement of an AM-MAC (multiply and accumulate) of the present disclosure compared with an Exact-MAC for different hardware bit precisions. FIG. 5B is a bar graph showing the power improvement of the present AM-MAC compared with an Exact-MAC for different hardware bit precisions.

Employing AMs to perform the compute-intensive operations, that is, MVM, can result in significant savings in both area utilization and power consumption. To explore this, the AM (labeled AM-MAC) and an exact fixed-point multiplier (labeled Exact-MAC) were designed and compared when used in MAC units. Each of these MACs comprises 100 individual multipliers and adders to perform 100 MAC operations in parallel. These units were synthesized using Cadence® GENUS running at 200 MHz, for various bit widths ranging from 8 bits to 16 bits. FIGS. 5A and 5B show the improvement in power and cell area of AM-MAC compared with the Exact-MAC. Each plot also shows the accuracy of the AM-MAC compared with the Exact-MAC for various bit widths.

As the bit precision increases, the accuracy of the AM-MAC improves from 97.8% to 99.9%, and the maximum savings in the power consumption and cell area reaches 79.49% and 63.30%, respectively. Note that the delay comparison of these units in isolation is not meaningful because the AM requires a variable number of cycles, that is, it is data dependent, for a single multiplication. Delay comparison of an LSTM network for an application is more meaningful and is described and quantified in Section 6.

3.4 Hardware Challenges and Design Decisions

Although employing AM leads to substantial reduction in area and power consumption, this variable-cycle multiplier poses a number of design challenges. One is the increased latency of the MVM units and EM units, both of which lie on a critical path between an input layer and an output layer. Modification of the related-art AM 32 (FIG. 2) to realize the AM 50 (FIG. 3) includes reducing the states of the FSM 38 (FIG. 2) to $2^{n-1}$ and results in improving the performance of the related-art AM 32 by 2×. However, this improvement by itself is not complete. Hence, another improvement maximally overlaps the execution of the MVM units with other computation units and over multiple time steps, resulting in a multi-level pipelined LSTM layer that is in accordance with the present disclosure. In addition, control of the MVM units with other computation units is organized as a two-level hierarchy to efficiently synchronize the AM units and overlap their computations to practically eliminate the waiting time, for example, arising from being a variable-cycle multiplier, and hide their latency. Finally, the potential loss of accuracy due to the presence of feedback and use of AMs is addressed by experimentally evaluating the optimal bit precision for the overall design. The optimal bit precision of embodiments of the present disclosure is evaluated by comparing its accuracy with two corresponding LSTM designs. The first LSTM design is the software implementation with floating-point calculations, and the second LSTM design generates exact fixed-point multiplications. This is performed for the following reasons:

1. to explore the effect of using disclosed AMs on error propagation through the LSTM for different bit precisions and to investigate whether the error accumulates in the hidden and memory states over various time-steps. This is performed by measuring the mean squared error between the hidden states/memory states of present embodiments and the floating-point implementation.
2. to evaluate the best hardware bit-precision for present embodiments that is a good trade-off between accuracy and hardware design metrics, that is, power, area, and performance. This is performed by calculating the classification accuracy of the present embodiments and comparing results with the corresponding exact fixed-point implementation.

3.5 System Overview

Figure 6:
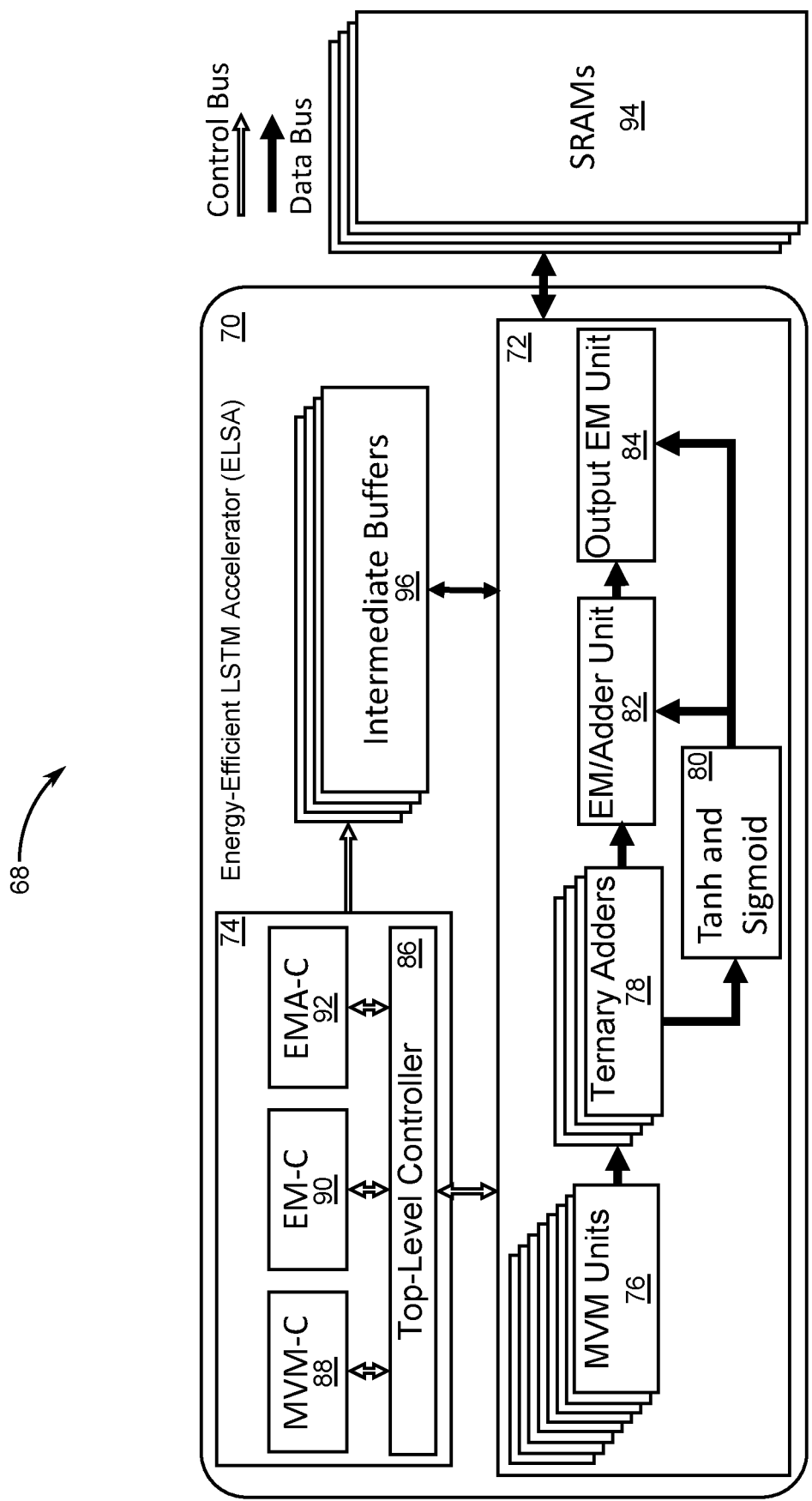
FIG. 6 is a block diagram of an ELSA (energy-efficient LSTM accelerator) that is comprised of the computation units and a hierarchy of control units.

FIG. 6 is a block diagram of neural network circuitry 68 that comprises an energy-efficient LSTM accelerator (ELSA) 70 that is comprised of computation units 72 and a hierarchy of control units 74. The top-level block diagram of the ELSA 70 illustrates the computation units 72 and the control units that synchronize them. The computation units 72 comprise a plurality of MVM units 76 to perform stochastic matrix-vector multiplications in parallel and ternary adders 78 to add the outputs of the plurality of MVM units 76 and bias vectors. The computational units 72 further comprise non-linear activation functions 80, that is, sigmoid and tan h, an EM/Adder unit 82 to stochastically compute the elements of a memory state, and an output EM unit 84 to compute elements of a hidden state. The control of the computational units 72 is performed by a top-level controller (Top-C) 86 in coordination with three mini controllers that are a MVM-C 88, EM-C 90, and EMA-C 92. At least one reason to include mini controllers is that the computation units 72 provide approximate multiplications that include variable-cycle operations and hence require synchronization with other single-cycle operations. Moreover, the computational units 72 that provide approximate multiplications execute in parallel to maximize throughput. Required neural network parameters are loaded into static random access memories (SRAMs) 94, and the data transfer for fetching/storing the parameters from memory is controlled by the controller units 74. Intermediate results of the computation units 74 are written into intermediate buffers 96 to reduce SRAM access time. Thus, the SRAMs 94 are only accessed for fetching the parameters and storing the computed values for the hidden and memory-states. The operation of the ELSA 70 and the present multi-level elastic pipelining methods are explained in details in the following sections.

3.6 Computation Units

MVM Unit:

Each of the plurality of MVM units 76 is a compact combination of the related-art AM units 32 that receives a matrix $X_{n \times m}$ and a vector $Y_{m \times 1}$ as inputs. A total of n AM units 32 are in each of the plurality of MVM units 76 and all share the same FSM 38 and down counter 46, thereby making the unit compact. Each of the plurality of MVM units 76 is internally pipelined with in pipeline stages. The parallel matrix vector multiplication in each of the plurality of MVM units 76 is performed by multiplying one column of matrix X with one element of vector Y at a time. To store the multiply and accumulate (MAC) results, the up-down counter 44 performs as an accumulator and its bit-width is increased by a few bits to preserve the precision.

Figure 7:
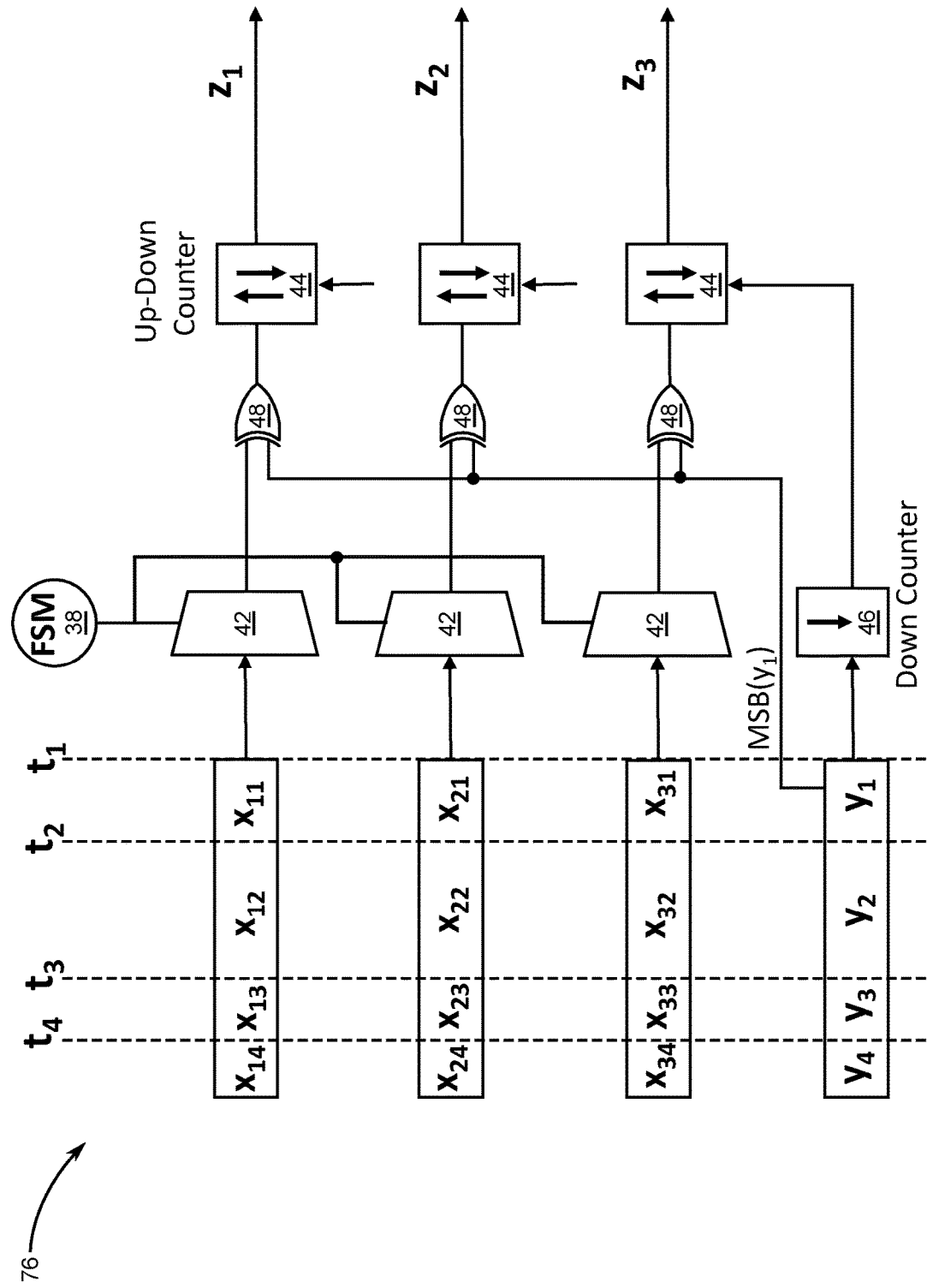
FIG. 7 is a diagram depicting an exemplary embodiment of the matrix-vector multiplier (MVM) unit.

FIG. 7 is a diagram depicting an exemplary embodiment of one of plurality of MVM units 76. In operation, beginning at a time $t_1$, the first column-scalar multiplication is performed on column $[x_{11}, x_{21}, x_{31}]^T$ and scalar $y_1$. The latency of these multiplications that execute in parallel is determined by $y_1$, and the first partial results are accumulated in the up-down counters. Without resetting the up-down counters, this process is repeated until time $t_4$, at which the last column-scalar multiplication, that is, $[x_{14}, x_{24}, x_{34}]^T \times y_4$, is computed and the final output vector $Z_{3 \times 1}$ is generated. As shown in FIG. 7, the difference between the start and end times of the operations is not necessarily equal due to the variable cycle execution.

EM/Adder and Output EM Units:

The EM/Adder unit 82 and the output EM unit 84 employ the accelerated AM 50 shown in Section 3.2 to compute the components of the C and h vectors, respectively.

Sigmoid and Tan h Units:

The non-linear activation functions 80 can be implemented in hardware using polynomial approximations, lookup tables, or CORDIC algorithms. These implementations utilize a large area and consume high power. Therefore, σ and tan h in the ELSA 70 are implemented as piecewise linear functions, as shown in Table 3, resulting in a more compact and lower power design.

TABLE 3

Piecewise Linear Activation Functions $$\text{HSig}(x) = \begin{cases} +1 & x > 2 \\ \frac{x}{4} + 0.5 & \text{otherwise} \\ 0 & x \leq -2 \end{cases} \quad \text{HTanh}(x) = \begin{cases} +1 & x > 1 \\ x & \text{otherwise} \\ -1 & x \leq -1 \end{cases}$$

3.7 Controller Units

Figure 8:
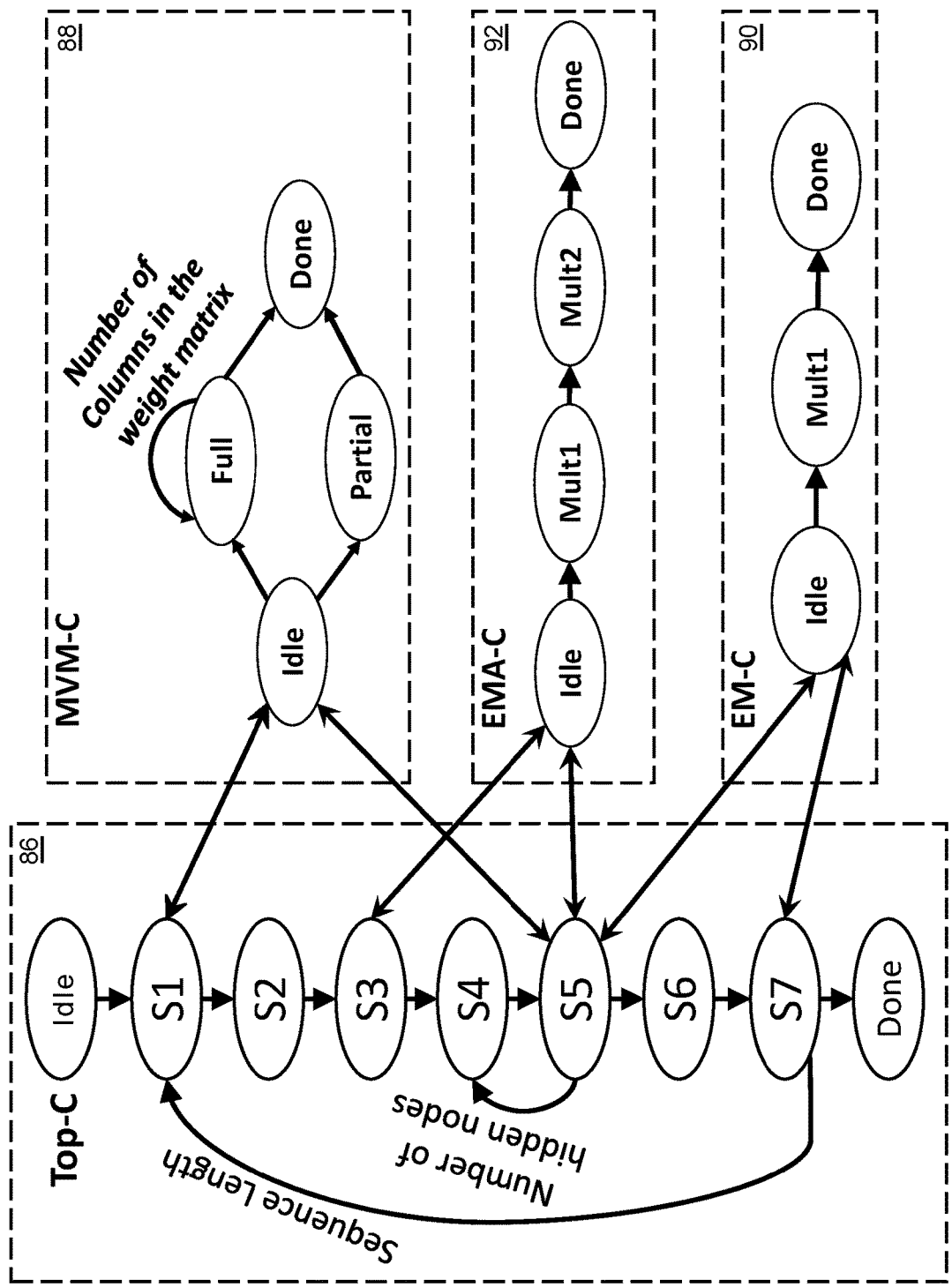
FIG. 8 is a diagram showing the controller hierarchy that comprises a top controller (Top-C) and three mini controllers: MVM-C, EMA-C (Element-wise Multiplier and Adder), and EM-C (element-wise multiplier).

FIG. 8 shows the control flow graph of the top-level controller (Top-C) 86, which comprises three mini controllers: MVM-C 88, EM-C 90, and EMA-C 92. The computation units 72 that involve variable-cycle operations, that is, the plurality of MVM units 76, the output EM unit 84, and EM/Adder unit 82, require synchronization with other single-cycle operations, for example, adders. Moreover, the computational units 72 have to execute in parallel to maximize throughput. This would be difficult to accomplish with the Top-C 86 alone. The mini controllers MVM-C 88, EM-C 90, and EMA-C 92 are designed to individually control the AM-based units, which include the plurality of MVM units 76, the output EM unit 84, and EM/Adder unit 82.

Top-Level Controller:

The Top-C 86 is responsible for synchronizing the AM-based units with other single-cycle units and enabling parallel executions. As shown in FIG. 8, the Top-C 86 comprises seven different states, in which states S1, S3, S5, and S7 activate the MVM, EM, and EMA units. For example, when Top-C 86 is in S1, the control token is passed to the MVM-C 88 to start the MVM operations. The MVM-C 88 operates on one set of data for multiple cycles and generates a complete detection signal that sends the control back to the Top-C 86. This is the case for all the states of the Top-C 86 that call the mini controllers MVM-C 88, EM-C 90, and EMA-C 92.

MVM Mini Controller:

The MVM-C 88 activates the MVM units 76 and comprises two major states: partial and full. The full state is responsible for operating on all the columns of the matrix iteratively to compute the complete results. The full state is used to generate the initial data for the pipelining flow. The partial state only operates on one column-scalar multiplication to generate one partial result. This state is designed to overlap its computation with the output EM unit 84 and EM/Adder unit 82, which are active in S5 of the Top-C 86.

EM Mini Controller:

The EM-C 90 includes one multiplication state to control the EM unit 84 and EM/Adder unit 82. Once the operation is done, it sends the control back to the Top-C 86, which then activates the MVM-C 88 for overlapping the data computation in time steps t+1 and t.

EMA Mini Controller:

The EMA-C 92 includes two consecutive multiplication states, Mult1 and Mult2, to activate the EM/Adder unit 82 for generating one component of the memory state vector at each iteration.

4 MULTI-LEVEL ELASTIC PIPELINING

Some of the computation units 72 in an LSTM network have data dependencies among themselves. These have to be executed sequentially, while others can be executed in parallel. Although a non-pipelined version is straightforward, the throughput would be unacceptably low. Pipelining is essential and the ELSA 70 incorporates pipelining at three levels, involving variable-cycle multipliers, various computation units within an LSTM layer, and across multiple time-steps.

FIG. 9 is a diagram similar to FIG. 1, but not the same in that the ELSA 70 comprises six elastic pipeline stages, which are labeled in FIG. 9 as stages 1, 2, 3, 4, 5, and 6. Stages 3-6 are within an LSTM layer. The latency of some of these stages is multi-cyclical, and conventional pipelining methods are not efficient enough to maximize the throughput of this design. FIG. 10 shows the control flow of the pipelining method along with the data computations done in each controller state. The overlapping of the computation units starts in controller state 4 where the operations in pipeline stages 2, 4, and 5 at time step t are performed in parallel. T is the total number of time steps, n is the total number of hidden nodes, and j denotes the $j_{th}$ component of its corresponding vector. The output of the stage operations and of the mode of operation for the plurality of the MVM units 76 are specified in Section 4. The pipeline stages shown in columns are executed in parallel and the stages shown in rows are performed sequentially.

In controller state 5, the operations in stage 6 (time step t) and stage 1 (time step t+1) are overlapped with two consecutive multiplications in stage 3 (time step t). Since the stage 3 operations are independent of the ones in stages 6 and 1, they can be executed in parallel. Note that with the scheme according to the present disclosure, the plurality of the MVM units 76 are almost completely overlapped with other units, as are the memory accesses, resulting in near maximum resource and memory utilization. All the intermediate results are written into the buffers so the SRAMs 94 are only accessed for fetching the parameters and writing back the computed values for the hidden-state (h) and memory-State (C). These result in substantial reduction in the overall design latency and in maximizing of the throughput and are quantified in Section 5 and Section 6.

5. PERFORMANCE MODELING FOR ELSA

A general model for the execution time of ELSA is presented as a function of hidden nodes and time steps so as to permit accurate evaluation of the ELSA 70 for any application that includes a network of LSTM layers, for example, speech recognition and image captioning, among others. A similar performance model for the non-pipelined version of the ELSA 70 is also constructed to quantify the improvements due to the pipelining strategy employed in the ELSA 70.

Let $X=(X_1, X_2, \ldots, X_T)$ and $H=(H_1, H_2, \ldots, H_T)$, where $X_t$ and $H_t$ are the input and output of ELSA at time step $t \in [1, 2, \ldots, T]$, respectively. In an LSTM layer with N hidden nodes, $X_t = x_t^1, x_t^2, \ldots, x_t^N$ and $H_t = [h_t^1, h_t^2, \ldots, h_t^N]$.

As discussed in Section 4, each controller state may contain a single pipeline stage, for example, controller state 2, or multiple pipeline stages, for example, controller state 4. The execution time (D) of each controller state (CS) is denoted by $D_{CS_i}$ for $i \in [1, 2, \ldots, 7]$. The execution time is expressed in number of clock cycles. The operations performed in $CS_2$, $CS_4$, and $CS_6$ are single cycle operations, whereas those in $CS_1$, $CS_3$, $CS_5$, and $CS_7$ are multi-cycle operations, the latencies of which are data dependent and is determined during run-time. The execution time of these operations is expressed in terms of the magnitude of their multiplicands, for example, $\|x_t^j\|$ in stage 1 of FIG. 9, where t denotes the time step and j is the $j_{th}$ component of the $X_t$ vector, because of the AM units, in which the multiplicands determine the execution time in the number of clock cycles. In all the equations, $j \in [1, 2, \ldots, N]$, $t \in [2, \ldots, T]$ and i, o and f correspond to the input, output, and forget gates, respectively. Note that the following equations can be directly derived from FIG. 9 and FIG. 10.

5.1 Pipelined Design

The delay equations for the ELSA 70 with multi-level pipelining are shown in Equations 9 to 15, after the initial data is produced to flow through the pipeline stages, that is, t>2. The quantities in the equations correspond to the variables in FIG. 10. For example, since the plurality of the MVM units 76 execute in parallel and X and H determine the execution time of these operations, $D_{CS_1}$ in Equation 9 is the maximum value of each component of these vectors.

$$D_{CS_1}(t) = \max(\|x_{t+1}^N\|, \|h_t^N\|), \quad (9)$$

$$D_{CS_3}(t) = \frac{\|i_t^1\| + \|f_t^1\|}{2}, \quad (10)$$

$$D_{CS_5}(j, t) = \max\left(\frac{\|o_t^j\|}{2} + \max_{t \neq 1}(\|x_{t+1}^j\|, \|h_t^j\|), \frac{\|i_t^{j+1}\| + \|f_t^{j+1}\|}{2}\right), \quad (11)$$

$$D_{CS_7}(t) = \frac{\|o_N^t\|}{2}, \quad (12)$$

$$D_{CS_2} = D_{CS_4} = D_{CS_6} = 1. \quad (13)$$

The total execution time of the ELSA 70 with pipelining ($D_{Total}^P(j, t)$), which is a function of hidden nodes and time steps, is shown in Equation 14 and is simplified in Equation 15.

$$D_{Total}^p(j,t) = \qquad (14)$$

$$\sum_{t=1}^{T}(D_{CS_1}(t) + D_{CS_3}(t) + 2 + D_{CS_7}(t)) + \sum_{t=2}^{T}\sum_{j=1}^{N-1}(D_{CS_5}(j,t)+1)$$

$$D_{Total}^p(j,t) = \sum_{t=2}^{T}(D_{CS_1}(t) = D_{CS_3}(t) + D_{CS_7}(t)) + \qquad (15)$$

$$\sum_{t=2}^{T}\sum_{j=1}^{N-1}(D_{CS_5}(j,t)) + T + N(T-1) - 1$$

5.2 Non-Pipelined Design

The delay equations for the non-pipelined design are shown in Equations 16 to 20. Note that the same units and structure are used for both of the designs. The only difference between these two designs is the way in which the operations are executed. In the non-pipelined version, the stages shown in FIG. 9 are executed in sequence. Hence, the execution time is expressed in terms of the pipeline stages and does not correspond to the control sequence shown in FIG. 8.

$$D_{stage_1}(j,t) = \sum_{j=1}^{N} \max(\|x_t^j\|, \|h_{t-1}^j\|), \qquad (16)$$

$$D_{stage_3}(j,t) = \frac{\|i_t^j\| + \|f_t^j\|}{2}, \qquad (17)$$

$$D_{stage_6}(j,t) = \frac{\|o_t^j\|}{2}, \qquad (18)$$

$$D_{stage_2} = D_{stage_4} = D_{stage_5} = 1. \qquad (19)$$

The total execution time of the non-pipelined design, which is denoted by $D_{Total}^{np}(j,t)$, is shown in Equation 20.

$$D_{Total}^{np}(j,t) = \qquad (20)$$

$$\sum_{t=2}^{T}(D_{stage_1}(j,t)) + 3N(T-1) + \sum_{t=2}^{T}\sum_{j=1}^{N}(D_{stage_3}(j,t) + D_{stage_6}(j,t))$$

To compute the impact of the pipelining method on the overall execution time of the ELSA 70, equations 15 and 20 were evaluated and compared for different bit precision, hidden nodes, and time steps. These are shown in Table 4. Thus, a total of 27 configurations were evaluated. Based on empirical data, the pipelining alone achieves 1.62× improvement in performance on average compared with the non-pipelined design. The speedup achieved for each configuration was close to 1.62×, so only the average is reported.

TABLE 4

Average Speed-up Achieved by Pipelining Method

| 27 Different LSTM Configurations | | | | Average Speedup (X) over 27 Configurations |
|---|---|---|---|---|
| Bit Precision | 8 | 12 | 16 | 1.62X |
| Hidden Nodes | 64 | 128 | 256 | |
| Time Steps | 10 | 100 | 1000 | |

6. EXPERIMENTAL RESULTS

6.1 Application

The functionality of the ELSA 70 is demonstrated for character-level language modeling, which is one of the most widely used tasks in natural language processing. Language modeling predicts the next character given a sequence of previous character inputs. Language modeling generates text, character by character, that captures the style and structure of the training dataset. The text that is produced looks like the original training set. The language modeling used for the present disclosure for training was written using a scientific computing framework referred to as Torch.

Please see FIG. 11, which is a diagram that depicts a neural network architecture 100 used for the language modeling. The language modeling comprises a first LSTM layer 102 and a second LSTM layer 104, each of which have 128-hidden nodes. For the evaluation, the model was trained on a subset of Shakespeare's works by setting the batch size, training sequence, and the learning rate to their default values of 50, 50, and 0.002, respectively. The input to this model is a character formed in a one-hot vector of size 65, that is, the number of characters used in this model, which includes the lower and uppercase letters with some special characters. The first LSTM layer 102 receives this input and generates a hidden vector of size 128, which is fed as input to the second LSTM layer 104. Similarly, the second LSTM layer 104 generates the final 128-node hidden vector and passes the output to the fully connected layer and the softmax 106. The final output is a 65-node vector the components of which represent the likelihood of that corresponding character being the output.

6.2 ASIC Implementation of the ELSA

The design of the ELSA 70 was specified at register-transfer level (RTL), synthesized, and placed and routed (using Cadence® tools) in 65 nm CMOS technology achieving a peak frequency of 322 MHz. The RTL design of the ELSA 70, including the control units 74, is fully parameterized and can adapt to any LSTM network topology. Hence, there is no need to do the pipelining again because the control units 74 automatically accommodate to the change. In addition, no design effort is required for varying the bit precision and modifying the size of the hidden nodes for a given application.

FIG. 12 is a line drawing of a physical layout of the ELSA 70 in 65 nm application specific integrated circuit (ASIC) 108. A first plurality of logic cells 110 are interconnected to form neural network computation units 72 that are configured to perform approximate computations. A second plurality of logic cells 112 are interconnected to form a controller hierarchy that is interfaced with the neural network computation units 72 to control pipelining of the approximate computations performed by the neural network computational units 72. The ELSA 70 has sufficiently small cell area and low power, making it suitable for use in embedded systems. Moreover, the efficient scheduling and pipelining techniques led to a design with high peak performance, making ELSA also suitable for real-time applications. Table 5 lists characteristics of the ASIC implementation.

TABLE 5

ASIC Implementation Results

| | ELSA |
|---|---|
| Core Voltage (V) | 1.1 |
| Number of MACs | 772 |
| Precision (bit) | 8-11 |
| Frequency (MHz) | 322 |
| Total Cell Area (mm$^2$) | SRAM area: 2.22 |
| | LSTM Cell area: 0.4 |
| On-Chip Memory (KB) | 106 |
| Peak Performance (GOP/s) | 27 |
| Power (mW) | 20.4 |
| Energy-Efficiency (GOP/s/mW) | 1.32 |

The ELSA 70 uses an 8-bit fixed-point representation (explained in Section 6.3) with the intermediate results extended to 11 bits to preserve the precision. The SRAMs 94 incorporated in the ELSA 70 were provided by the 65 nm library supplier. The SRAMs 94 in this particular implementation were larger than necessary and hence their area and power numbers shown in FIG. 12 should be considered as pessimistic, by as much as ~6%. The SRAM area of the ELSA 70 is approximately 3× larger than its logic area. Clock gating of the computation units 72 and the control units 74, as well as the use of sleep modes for the SRAMs, were employed to further reduce power consumption. Because of the variable-cycle pipeline stages, the ELSA 70 greatly benefits from clock-gating. The greatest reduction in power was achieved when the computation units in a multi-cycle pipeline stage were maximally utilized. Hence, all the other idle units were clock-gated for several cycles.

FIG. 13 is a line drawing of a field programmable logic array (FPGA) 114 on which the ELSA 70 may be implemented. A first plurality of logic cells 116 is interconnected to form neural network computation units 72 that are configured to perform approximate computations. A second plurality of logic cells 118 is interconnected to form a controller hierarchy that is interfaced with the neural network computation units 72 to control pipelining of the approximate computations performed by the neural network computational units 72. Rows of input/output pads 120 are shown surrounding the first plurality of logic cells 116 and the second plurality of logic cells 118.

FIGS. 14A and 14B show the power and area breakdown of the components comprising the ELSA 70, including the SRAMs 94. The power consumption was measured using data activity information (*.vcd) obtained from the testbench by simulating the design after placement and routing. As expected, the SRAMs 94 consume the most power. Among the subunits, the control units 74 contribute the least to the power consumption and the MVM units 76 consume the most, as there are 772 MACs in this design. A substantial difference exists between the area utilization of the SRAMs 94 and all the other components. Although there are 772 MACs in this design, the MVM units 76 constitute only 10.66% of the total area.

6.2.1 Comparison with the Baseline-LSTM

The LSTM network was also designed with 8-bit exact fixed-point multipliers and is referred to as the Baseline-LSTM. This is functionally equivalent to the ELSA 70 except that all the AM units 50 were replaced with the exact multipliers. The exact multipliers were optimally synthesized by the Cadence tools, that is, Genus, based on the clock frequency constraint. This is automatically generated by Genus to meet the timing constraints corresponding to the given clock frequency. The Baseline-LSTM was also specified in RTL and was synthesized and placed and routed in 65 nm technology. The ASIC implementation results of ELSA are compared with the Baseline-LSTM, and the normalized results are shown in FIGS. 15 and 16.

FIG. 15 is a bar graph showing the ASIC implementation results of ELSA compared with the Baseline-LSTM. In FIG. 15, the ELSA 70 and the Baseline-LSTM were run at the same clock frequency—the peak frequency of the Baseline-LSTM. Both of these designs were run at the same clock frequency, the highest that the Baseline-LSTM can achieve. The reported numbers are normalized and they are for the neural network circuitry 68, including the computational units 72 and the SRAMs 94. The energy and area efficiency of the ELSA 70 exceeds that of the Baseline-LSTM by factors of 1.2×. The energy efficiency (GOP/s/mW) and area efficiency (GOP/s/mm$^2$) of the ELSA 70 exceeds that of the Baseline-LSTM by 1.2×. The cell area and power consumption of the ELSA 70 are also lower (0.3×), but the peak performance of the Baseline-LSTM is higher by 3.3×. This is to be expected since the operations in the Baseline-LSTM are single-cycle operations and the Baseline-LSTM was run at its highest clock frequency, unlike for the ELSA 70.

FIG. 16 is a bar graph showing the ASIC implementation results of the ELSA 70 compared with the Baseline-LSTM. For a thorough comparison, both designs were also run at their individual maximum achievable clock frequencies. The results are shown in FIG. 16. The reported numbers are normalized and they are for the neural network circuitry 68, including the computational units 72 and the SRAMs 94. The energy and area efficiency of the ELSA 70 exceeds that of the Baseline-LSTM by factors of 1.2× and 3.6×, respectively. Due to the compactness of the compute-intensive units of the ELSA 70, which are on a critical path between input and output, the ELSA 70 can run 3.2× faster in terms of clock frequency. While the ratio of the energy efficiency is maintained at 1.2× moving from FIG. 15 to FIG. 16, the area efficiency of the ELSA 70 is greatly improved and reaches 3.6×. This is mainly due to the increase in the peak performance, since the increase in the cell area was negligible and the ratio remains at 0.3×. Although running the ELSA 70 at its highest clock frequency increased its power consumption, power consumption is still lower (0.9×) than that of the Baseline-LSTM.

6.2.2 Comparison with the Existing ASIC Implementations

The ELSA 70 was also compared with the existing ASIC implementations of LSTMs, DNPU and CHIPMUNK, as shown in Table 6. DNPU is a CNN-RNN processor and its application requires a combination of CNNs and RNNs. CNN is its major component and RNN was not evaluated as a stand-alone component. Although the ELSA 70 has twice the bit-precision and uses 10× more SRAMs than DNPU, it achieves higher peak-performance and consumes less power. DNPU's bit-width (4-bits) is half of ELSA's. Scaling ELSA to 4-bits would increase the peak-performance (at least 54 GOPs) and the frequency (~400 MHz), and decrease the power consumption. These would lead to a much higher energy-efficient design. In addition, DNPU has only 10 KB of on-chip memory, which limits its peak-performance by requiring the use of external memory even for small networks. The application on which the functionality of ELSA was evaluated (even for 4-bits) does not fit on DNPU and requires a DRAM. This lowers the peak-performance of DNPU substantially. CHIPMUNK uses 22% smaller SRAMs. It achieves higher peak-performance, but it consumes 30% more power, making ELSA more energy-efficient. As shown in the last entry of Table 6, the energy-efficiency of ELSA exceeds that of DNPU and CHIPMUNK by 1.2× and 1.18×, respectively.

TABLE 6

Comparison with Previous ASIC Implementations

|  | DNPU | CHIPMUNK | ELSA |
|---|---|---|---|
| Precision (bit) | 4-7 | 8-16 | 8-11 |
| Frequency (MHz) | 200 | 168 | 322 |
| On-Chip Memory (KB) | 10 | 82 | 106 |
| Peak Performance (GOP/s) | 25 | 32.3 | 27 |
| Power (mW) | 21 | 29.03 | 20.4 |
| Energy-Efficiency (GOP/s/mW) | 1.10 | 1.11 | 1.32 |
| ELSA's Energy-Efficiency (X) | 1.2 | 1.18 | 1 |

6.3 Accuracy Versus Hardware Bit Precision

Two main explorations on the accuracy of the ELSA 70 were performed. First, the effect of using the AM units 50 on error propagation through the LSTM for different bit precision was explored. Specifically, whether the error accumulates in the hidden and memory states over various time-steps was investigated. The baseline design against which the precision of the ELSA 70 was compared is a software implementation using floating-point calculations. The precision of the ELSA 70 was also compared with a design that uses exact fixed-point multiplications.

6.3.1 Comparison with Software Floating-Point Implementation

Due to the recurrent nature of the LSTM on the memory and hidden states, a thorough comparison of the accuracy is performed at an application level, that is, language modeling, for both h and C. For a fair comparison, the same input sequence $X_t$ was fed to both designs, for $t \in [1, 2, \ldots, 1000]$.

FIGS. 17A, 17B, and 17C are plots showing the mean squared error (MSE) of the hidden state of the ELSA 70 and the floating point for different bit precisions. Each plot depicts the MSE for a specific precision over 1000 time steps. A dashed white line on each plot is the trend line across all the time-steps. The dashed white line shows that the error does not accumulate at the application level. The MSE decreases substantially as the bit precision increases from 5 to 8 bits. From the 8-bit design and above, the magnitude of MSE is close to zero, and it does not decrease significantly with the increase in the precision. The same trend is true for the memory state, for which the plot is not included for brevity. The 8-bit design is a good choice for language modeling since the MSE is very close to zero and the decreasing rate becomes smaller from 8 to 16 bits. The accuracy was computed as the MSE between results from the implementation of the ELSA 70 and the floating-point implementation, for which the results are displayed in FIGS. 17A, 17B, and 17C for various bit widths for the ELSA 70. A key observation is that the error does not accumulate and does not grow, a behavior that is consistent for all the bit precisions, because of the inherent feature of the AM 50 that rounds up/down the final product based on the given inputs. This has the effect of canceling the errors. The MSE trend line is very close to zero at 8 bits and remains nearly the same up to 16 bits. This consistency is due to the good accuracy of the AM 50 for 8 bits and above. The same trend is true for the memory state of the ELSA 70, for which the plots are omitted for brevity. Based on these experiments, to achieve a good trade-off between the accuracy of the ELSA 70 and its hardware design metrics, that is, power, area, and performance, the bit-precision was set to 8 bits.

6.3.2 Comparison with Exact Fixed-Point Implementation

The accuracy of the ELSA 70 was compared with an LSTM design with exact fixed-point multipliers, assuming a bit precision of 8 for both. This experiment demonstrates how the accuracy changes from a single one of the AM 50 up to a network of LSTMs. Table 7 shows the accuracy for a single multiplication, a MAC unit, an LSTM layer, and an application, that is, language modeling that has two consecutive LSTM layers, when the AM 50 is employed. The interpretation of Table 7 is as follows.

1. The accuracy for one multiplication and MAC operation was computed as the fraction of differences between the 8-bit AM and its corresponding 8-bit fixed-point exact multiplier. That is, for each input, the relative error of every pair of corresponding multipliers and MAC units was computed, and these values were averaged over the set of applied inputs. The mean and standard deviation (Std. Dev.) are also reported.
2. The accuracy for the ELSA 70 was measured as the average accuracy of the hidden states. This is the relative error between the corresponding values of $h_t$ (see FIG. 9) in the 8-bit AM and 8-bit fixed-point exact multiplier, averaged over the set of applied inputs.
3. The last entry of Table 7 reports the classification accuracy of the ELSA 70 at the application level. The accuracy degraded by 2.5% when moving from a single one of AM 50 to a full application that comprises a network of consecutive LSTMs. The Top-5 classification accuracy—a standard measure particularly for language modeling—was 96%.

TABLE 7

ELSA Accuracy for Various Uses

|  | Relative Error | Mean of Relative Error | Std. Dev. of Relative Error |
|---|---|---|---|
| One Multiplication | 1.5% | 0.00562 | 0.00415 |
| MAC Operations | 2.2% | 0.00566 | 0.00416 |
| LSTM (one layer) | 2.3% | 0.00181 | 0.00149 |

|  | Classification Accuracy |
|---|---|
| Application (LM) | 96% |

7 CONCLUSIONS

The present disclosure relates to a scalable LSTM hardware accelerator, referred to as the ELSA 70 that results in small area and high energy efficiency. These characteristics are due to several architectural features, including the use of an improved low-power, compact approximate multiplier in the compute-intensive units of ELSA 70, and the design of two levels of controllers that are required for handling the variable-cycle multiplications. Moreover, the ELSA 70 includes efficient synchronization of the elastic pipeline stages to maximize the utilization. The ELSA 70 achieves promising results in power, area, and energy efficiency, making it suitable for use in embedded systems and real-time applications. This accelerator can be further improved by incorporating more compact SRAMs to achieve a more optimized floorplan. In addition, the energy efficiency can be significantly improved by applying weight compression techniques.

Those skilled in the art will recognize improvements and modifications to the preferred embodiments of the present disclosure. All such improvements and modifications are considered within the scope of the concepts disclosed herein and the claims that follow.

What is claimed is:

1. Neural network circuitry comprising:
a first plurality of logic cells that are interconnected to form neural network computation units that are configured to perform approximate computations, wherein the neural network computation units include approximate multiplier units that each comprise:
  a binary-to-stochastic converter having a binary data input and a bitstream output, wherein the binary-to-stochastic converter is configured to pseudo-randomly shuffle bit positions of binary data received at the binary data input to form a bitstream at the bitstream output;
  a first counter having a first count input coupled to the bitstream output, a stop count input, and a product output, wherein the first counter is configured to provide at the product output, a result of an approximate multiplication of the binary data by weight data once the first counter stops in response to a stop signal; and
  a second counter having a stop count output coupled to the stop count input, wherein the second counter is configured to generate the stop signal to stop the first counter in response to a stop value counted by the second counter; and
a second plurality of logic cells that are interconnected to form a controller hierarchy that is interfaced with the neural network computation units to control pipelining of the approximate computations performed by the neural network computation units.

2. The neural network circuitry of claim 1 wherein the neural network computation units comprise a neural network.

3. The neural network circuitry of claim 2 wherein the neural network is a recurrent neural network of a long short-term memory type.

4. The neural network circuitry of claim 2 wherein the neural network computation units comprise:
a plurality of matrix-vector multiplier units that are configured to multiply the input data by the weight data;
a plurality of ternary adders configured to add bias values to products of the plurality of matrix-vector multiplier units;
a plurality of activation function units configured to receive output from the plurality of ternary adders and provide non-linear response values to neurons comprising the neural network;
a first element-wise approximate multiplier and adder unit configured to multiply and accumulate the non-linear response values to provide accumulated values; and
an output element-wise approximate multiplier unit configured to multiply feedback values from an output of the neural network computation units with the accumulated values.

5. The neural network circuitry of claim 4 wherein the controller hierarchy comprises:
a matrix-vector multiplier controller configured to control multiplication operations of the plurality of matrix-vector multiplier units;
a second element-wise approximate multiplier and adder unit controller configured to control multiplication and addition operations of the element-wise approximate multiplier and adder unit;
an output element-wise multiplier controller configured to control multiplication operations of the output element-wise approximate multiplier unit; and
a top-level controller to control pipelining between the matrix-vector multiplier controller, the element-wise approximate multiplier and adder unit and the output element-wise approximate multiplier unit.

6. The neural network circuitry of claim 4 further comprising intermediate buffers coupled between the controller hierarchy and the neural network computation units, which are configured to store intermediate results of the neural network computation units to reduce external memory access time.

7. The neural network circuitry of claim 1 wherein the approximate multiplier units are configured to yield a single multiplication accuracy having an error of no more than 1.5%.

8. The neural network circuitry of claim 1 wherein the first counter is an up-down counter.

9. The neural network circuitry of claim 8 wherein the second counter is a down counter.

10. The neural network circuitry of claim 1 wherein the stop value is equal to $W \times 2^{N-1}$ where W is a magnitude of the weight data and N is the number of bits of the weight data.

11. The neural network circuitry of claim 1 further comprising:
a preprocessing unit having an initialize first counter output coupled to an initialize first counter input of the first counter, an initialize second counter output coupled to an initialize second counter input of the second counter, and a weight data input, wherein the preprocessing unit is configured to:
  receive the weight data (W) through the weight data input;
  generate a count value and the stop value that are each equal to $W \times 2^{N-2}$ where W is a magnitude of the weight data and N is the number of bits of the weight data;
  initialize the first counter with the count value; and
  initialize the second counter with the stop value.

12. The neural network circuitry of claim 11 wherein the preprocessing unit comprises:
a inverter gate having an inverter input configured to receive a sign bit of the binary data;
an exclusive-or (XOR) gate having a first XOR input coupled to an inverter output of the inverter gate, a second XOR input configured to receive the weight data and an XOR output;
right-shift logic having a shift input coupled to the second XOR input and a shifter output coupled to the initialize second counter input; and
sign determining logic having a sign input coupled to the XOR output, a shifted weight input coupled to the shifter output, wherein the sign determining logic is configured to output the count value on the initialize first counter output coupled to the initialize first counter input of the first counter.

13. The neural network circuitry of claim 1 wherein the first plurality of logic cells and the second plurality of logic cells comprise a field-programmable gate array.

14. The neural network circuitry of claim 1 wherein the first plurality of logic cells and the second plurality of logic cells comprise an application-specific integrated circuit.

15. The neural network circuitry of claim 14 wherein the application-specific integrated circuit has an efficiency of at least 1.3 giga-operations per second per milliwatt when operated at a frequency of 322 MHz.

16. The neural network circuitry of claim 14 wherein the application-specific integrated circuit is configured to perform between 27 giga-operations per second and 50 giga-operations per second.

17. The neural network circuitry of claim 14 wherein the first plurality of logic cells and the second plurality of logic cells integrated into the application-specific integrated circuit have cell area that is less than one-half of a square millimeter.

18. The neural network circuitry of claim 14 wherein the application-specific integrated circuit operates on less than 21 milliwatts at a core voltage of less than 1.2 volts.

* * * * *